(12) United States Patent
Weiss et al.

(10) Patent No.: US 9,617,490 B2
(45) Date of Patent: Apr. 11, 2017

(54) VEHICLE POWERTRAIN WITH ONBOARD CATALYTIC REFORMER

(71) Applicants: Brian Michael Weiss, Bridgewater, NJ (US); Walter Weissman, Basking Ridge, NJ (US); Tilman Wolfram Beutel, Neshanic Station, NJ (US); John Francis Brody, Bound Brook, NJ (US); Eugine Choi, Marlton, NJ (US); Wenjun Li, Phillipsburg, NJ (US); Paul Dmitri Madiara, Bethlehem, PA (US); Chris Esther Kliewer, Clinton, NJ (US); Karl Gottlieb Strohmaier, Port Murray, NJ (US); Scott J. Weigel, Allentown, PA (US); Brett Loveless, Maplewood, NJ (US); Makota Koike, Nagakute (JP); Hiroshi Miyagawa, Nagakute (JP)

(72) Inventors: Brian Michael Weiss, Bridgewater, NJ (US); Walter Weissman, Basking Ridge, NJ (US); Tilman Wolfram Beutel, Neshanic Station, NJ (US); John Francis Brody, Bound Brook, NJ (US); Eugine Choi, Marlton, NJ (US); Wenjun Li, Phillipsburg, NJ (US); Paul Dmitri Madiara, Bethlehem, PA (US); Chris Esther Kliewer, Clinton, NJ (US); Karl Gottlieb Strohmaier, Port Murray, NJ (US); Scott J. Weigel, Allentown, PA (US); Brett Loveless, Maplewood, NJ (US); Makota Koike, Nagakute (JP); Hiroshi Miyagawa, Nagakute (JP)

(73) Assignees: ExxonMobil Research and Engineering Company, Annandale, NJ (US); Toyota Central Research and Development Labs, Inc., Magakute, Aichi (JP)

( * ) Notice: Subject to any disclaimer, the term of this patent is extended or adjusted under 35 U.S.C. 154(b) by 42 days.

(21) Appl. No.: 14/566,877

(22) Filed: Dec. 11, 2014

(65) Prior Publication Data

US 2015/0167587 A1    Jun. 18, 2015

Related U.S. Application Data

(60) Provisional application No. 61/915,555, filed on Dec. 13, 2013.

(51) Int. Cl.
*B01J 29/44* (2006.01)
*C10L 3/10* (2006.01)
(Continued)

(52) U.S. Cl.
CPC ............... *C10L 3/10* (2013.01); *B01J 23/63* (2013.01); *B01J 29/068* (2013.01); *B01J 29/44* (2013.01);
(Continued)

(58) Field of Classification Search
CPC . F01N 2240/30; F02M 21/0227; F02M 26/36
See application file for complete search history.

(56) References Cited

U.S. PATENT DOCUMENTS 3,702,886 A    11/1972   Argauer et al.
3,709,979 A    1/1973    Chu
(Continued)

FOREIGN PATENT DOCUMENTS

DE    10018792 C1      9/2001
DE    102012204649 A1  9/2013
(Continued)

OTHER PUBLICATIONS

Machine translation of DE 102012204649 A1, accessed on May 6, 2016.*

(Continued)

Primary Examiner — Jonathan Matthias
(74) Attorney, Agent, or Firm — David M. Weisberg

(57) ABSTRACT

Catalyst compositions suitable for use in the exhaust gas recycle stream of an internal combustion engine are provided. Such catalyst compositions typically provide significant amounts of methane in addition to syngas. A reformer incorporating such a catalyst for use in an exhaust gas recycle portion of an internal combustion engine powertrain is described. A powertrain incorporating such a reformer, a method of increasing the octane rating of an exhaust gas recycle stream, and a method of operating an internal combustion engine using methane-assisted combustion are also described.

16 Claims, 21 Drawing Sheets

(51) Int. Cl.
| | |
|---|---|
| F01N 3/20 | (2006.01) |
| F02B 43/12 | (2006.01) |
| F02B 61/02 | (2006.01) |
| F02M 21/02 | (2006.01) |
| F02M 27/02 | (2006.01) |
| B01J 29/74 | (2006.01) |
| B01J 29/80 | (2006.01) |
| C10L 3/00 | (2006.01) |
| C01B 3/40 | (2006.01) |
| B01J 23/63 | (2006.01) |
| B01J 29/068 | (2006.01) |
| F02M 26/35 | (2016.01) |
| F02M 26/36 | (2016.01) |
| F02B 37/013 | (2006.01) |
| F02B 43/10 | (2006.01) |
| F02M 26/05 | (2016.01) |

(52) U.S. Cl.
CPC ............ *B01J 29/743* (2013.01); *B01J 29/80* (2013.01); *C01B 3/40* (2013.01); *C10L 3/00* (2013.01); *F01N 3/20* (2013.01); *F02B 43/12* (2013.01); *F02B 61/02* (2013.01); *F02M 21/0227* (2013.01); *F02M 26/35* (2016.02); *F02M 26/36* (2016.02); *F02M 27/02* (2013.01); *B01J 2523/00* (2013.01); *C01B 2203/0233* (2013.01); *C01B 2203/0238* (2013.01); *C01B 2203/1047* (2013.01); *C01B 2203/1064* (2013.01); *C01B 2203/1082* (2013.01); *C01B 2203/1241* (2013.01); *C01B 2203/1247* (2013.01); *C10L 2230/22* (2013.01); *C10L 2270/02* (2013.01); *C10L 2290/02* (2013.01); *C10L 2290/24* (2013.01); *F02B 37/013* (2013.01); *F02B 2043/103* (2013.01); *F02M 26/05* (2016.02); *Y02P 20/142* (2015.11); *Y02T 10/126* (2013.01); *Y02T 10/32* (2013.01)

(56) References Cited

U.S. PATENT DOCUMENTS

| | | |
|---|---|---|
| 3,717,129 A | 2/1973 | Fox |
| 3,832,449 A | 8/1974 | Rosinski et al. |
| 3,855,980 A | 12/1974 | Weisz et al. |
| 3,918,412 A | 11/1975 | Lindstrom |
| 4,003,343 A | 1/1977 | Lee |
| 4,016,218 A | 4/1977 | Haag et al. |
| 4,016,245 A | 4/1977 | Plank et al. |
| 4,046,522 A | 9/1977 | Chen et al. |
| 4,070,993 A | 1/1978 | Chen |
| 4,076,842 A | 2/1978 | Plank et al. |
| 4,086,186 A | 4/1978 | Rubin et al. |
| RE29,948 E | 3/1979 | Dwyer et al. |
| 4,397,827 A | 8/1983 | Chu |
| 4,556,477 A | 12/1985 | Dwyer |
| 4,862,836 A | 9/1989 | Chen et al. |
| 4,873,067 A | 10/1989 | Valyocsik et al. |
| 4,884,531 A | 12/1989 | Degnan, Jr. et al. |
| 5,753,143 A | 5/1998 | Bhat et al. |
| 6,242,380 B1 | 6/2001 | Park et al. |
| 6,397,790 B1 | 6/2002 | Collier, Jr. |
| 6,405,720 B1 | 6/2002 | Collier, Jr. |
| 6,508,209 B1 | 1/2003 | Collier, Jr. |
| 7,536,981 B2 | 5/2009 | Sadikay |
| 2004/0035395 A1 | 2/2004 | Heywood et al. |
| 2009/0035192 A1 | 2/2009 | Hwang |
| 2010/0300382 A1 | 12/2010 | Yahagi et al. |
| 2012/0291424 A1 | 11/2012 | Inuzuka et al. |
| 2013/0102824 A1 | 4/2013 | Beutel et al. |
| 2014/0140921 A1 | 5/2014 | Burton et al. |

FOREIGN PATENT DOCUMENTS

| | | | |
|---|---|---|---|
| EP | 1267432 A2 | 12/2002 | |
| EP | 2143932 A1 | 1/2010 | |
| FR | 2928700 A1 | 9/2009 | |
| JP | 2008101549 A | 5/2008 | |
| JP | 2008223537 A | 9/2008 | |
| JP | 2008298000 A | 12/2008 | |
| RU | 2372277 C1 | 11/2009 | |
| WO | 2004113223 A1 | 12/2004 | |
| WO | WO 2007007107 A1 * | 1/2007 | ......... B01D 53/9409 |
| WO | 2013050964 A1 | 4/2013 | |

OTHER PUBLICATIONS

Vernikovskaya et al., "Transient behavior of the methane partial oxidation in a short contact time reactor: Modeling on the base of catalyst detailed chemistry", Chemical Engineering Journal, Aug. 30, 2007, pp. 180-189, vol. 134, No. 1-3, Elsevier.
Karatzas et al., "Autothermal reforming of low-sulfur diesel over bimetallic RhPt supported on A12O3, CeO2-ZrO2, SiO2 and TiO2", Applied Catalysis B: Environmental, Aug. 1, 2011, pp. 476-487, vol. 106, No. 3-4, Elsevier.
International Search Report and Written Opinion from PCT/US2014/069674 dated Mar. 27, 2015.
International Search Report and Written Opinion from PCT/US2014/069677 dated Mar. 27, 2015.
International Search Report and Written Opinion from PCT/US2014/069679 dated Mar. 27, 2015.
Rostrup-Nielsen, "Catalytic Steam Reforming" Catalysis Science and Technology, Eds. J.R. Anderson, M. Boudart, 1984, pp. 1-118, chapter 1, vol. 5, Springer Verlag, Berlin, Germany.
Barbier et al., "Reactivity of steam in exhaust gas catalysis I. Steam and oxygen/steam conversions of carbon monoxide and of propane over PtRh catalysts", Appl. Catal. B: Environmental, Dec. 1, 1993, pp. 61-83, vol. 3, iss. 1, Elsevier.
Nakamura et al., Role of support in reforming of CH4 with CO2 over Rh catalysts:, Catalysis Letters, Sep. 1, 1994, pp. 265-270, vol. 25, iss. 3-4, Springer.
Kochloefl, "Steam Reforming", Energy-Related Catalysis, Handbook of Heterogeneous Catalysis, Jul. 10, 1997, pp. 1819-1831, chapter 3.2, VCH Weinheim, Wiley.
Wei et al., "Structural requirements and reaction pathways in methane activation and chemical conversion catalyzed by rhodium", Journal of Catalysis Jul. 1, 2004, pp. 116-127, vol. 225, iss. 1, Elsevier.
Kolb et al., "Propane steam reforming in micro-channels—results from catalyst screening and optimisation", Appl. Catal. A: General, Dec. 8, 2004, pp. 155-166, vol. 277, iss 1-2, Elsevier.
Tsolakis, et al., "Sensitivity of process efficiency to reaction routes in exhaust-gas reforming of diesel fuel", Chemical Engineering Journal, Apr. 1, 2006, pp. 131-136, vol. 117, iss. 2, Elsevier.

(56) References Cited

OTHER PUBLICATIONS

Graf et al., "Comparative study of steam reforming of methane, ethane and ethylene on Pt, Rh and Pd supported on yttrium-stabilized zirconia", Appl. Catal. A: General, Nov. 20, 2007, pp. 310-317, vol. 332, iss. 2, Elsevier.

Schadel, et al., "Steam reforming of methane, ethane, propane, butane, and natural gas over a rhodium-based catalyst", Catalysis Today, Apr. 1, 2009, pp. 42-51, vol. 142 iss. 1-2, Elsevier.

Li et al., "Influence of ceria and nickel addition to alumina-supported Rh catalyst for propane steam reforming at low temperatures", Applied Catalysis.A: General, Apr. 15, 2009 pp. 213-222, vol. 357, iss. 2, Elsevier.

Jakobsen et al., "Methane Steam Reforming Kinetics for a Rhodium-Based Catalyst", Catalysis Letters, Dec. 1, 2010 pp. 90-97, vol. 140, iss., 3-4, Springer.

Gomes, et al., "Thermodynamic and experimental studies of catalytic reforming of exhaust gas recirculation in gasoline engines", Applied Catalysis B: Environmental, Feb. 1, 2011, pp. 44-53, vol. 102, iss. 1-2, Elsevier.

Ligthart et al., "Influence of particle size on the activity and stability in steam methane reforming of supported Rh nanoparticles", Journal of Catalysis, Jun. 13, 2011, pp. 206-220, vol. 280, iss. 2, Elsevier.

\* cited by examiner

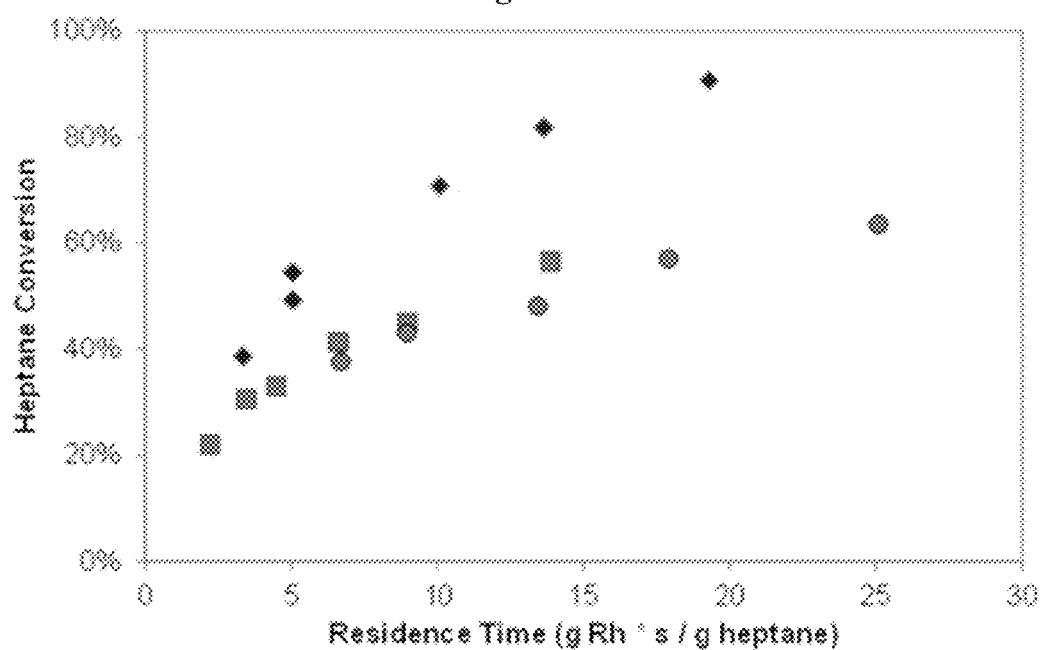

VEHICLE POWERTRAIN WITH ONBOARD CATALYTIC REFORMER

CROSS REFERENCE TO RELATED APPLICATIONS

This application claims the benefit of provisional U.S. Application No. 61/915,555, filed on Dec. 13, 2013, the entirety of which is incorporated herein by reference.

FIELD OF THE INVENTION

Embodiments of the invention relate to catalytic reforming of mixtures of hydrocarbon-containing fuels and internal combustion engine exhaust gas. In particular, embodiments of the invention relate to catalytic reforming of such engine exhaust gas mixtures that produce an amount of methane sufficient to sustain the formation of CO (and/or $CO_2$) and $H_2$ in the reformer.

BACKGROUND

Conventional internal combustion engine designs can typically include a single fuel for combustion within the engine cylinders. This can require careful selection of an appropriate fuel, so that the fuel has appropriate combustion properties, such as a suitable Research Octane Number or a suitable flame speed. This can limit the selection of fuels, as some compositions that may be suitable from an energy content standpoint can lack appropriate combustion properties.

In addition to naphtha boiling range (gasoline) and distillate boiling range (kerosene or diesel) fuels, some alternative types of fuels are available for use in internal combustion engines. For example, an engine can be configured for use with natural gas as a fuel.

SUMMARY OF THE INVENTION

In one aspect, a method of operating an internal combustion engine using methane-assisted combustion is provided, the method including (a) providing an exhaust gas-containing mixture to an exhaust gas recycle reformer, the exhaust gas-containing mixture comprising a mixture comprising recycled exhaust gas and a first hydrocarbon-containing fuel; (b) converting at least a portion of the exhaust gas-containing mixture in the presence of heat and a catalyst composition to a reformed gaseous mixture comprising $CH_4$, CO, $CO_2$, $H_2O$, $N_2$, and $H_2$, said $CH_4$ being present at a concentration greater than 1.0 mol % $CH_4$, based on the total moles of gas in the reformed gaseous mixture; (c) introducing at least a portion of the reformed gaseous mixture and a second hydrocarbon-containing fuel into the engine, wherein said second hydrocarbon-containing fuel may be the same or different from the first hydrocarbon-containing fuel; (d) combusting the at least a portion of the reformed gaseous mixture and second hydrocarbon-containing fuel in the engine to form an exhaust gas, the exhaust gas comprising a first portion of the exhaust gas and a second portion of the exhaust gas; and (e) passing a first portion of the exhaust gas through a first heat exchanger to extract heat from the first portion of the exhaust gas, the recycled exhaust gas comprising the second portion of the exhaust gas.

In another aspect, a method of increasing the octane rating of an internal combustion engine exhaust gas stream is provided, said method comprising: (a) providing an exhaust gas-containing mixture to an exhaust gas recycle reformer, the exhaust gas-containing mixture comprising recycled exhaust gas and a first hydrocarbon-containing fuel, said exhaust gas-containing mixture containing about 3.0 mol % of $CH_4$ or less and having an initial octane rating, and (b) converting under reforming conditions, optionally in the presence of heat and a catalyst composition, at least a portion of the exhaust gas-containing mixture to a reformed gaseous mixture having a second octane rating (RON) from 100 to 125, the reformed gaseous mixture comprising $H_2$, CO, $CO_2$, $H_2O$, $N_2$, and greater than 1.0 mol % $CH_4$ based on the total moles of gas in the reformed gaseous mixture.

In yet another aspect, a reformer for use in an exhaust gas recycle portion of an internal combustion engine powertrain is provided, the reformer comprising a catalyst composition specifically configured to convert a mixture comprising a recycled (internal combustion engine) exhaust gas and a hydrocarbon-containing fuel to a reformed gaseous mixture comprising $H_2$, CO, $CO_2$, $H_2O$, $N_2$, and greater than 1.0 mol % $CH_4$ based on the total moles of gas in the gaseous mixture.

In still another aspect, an internal combustion engine powertrain is provided, comprising: (a) internal combustion engine having an exhaust manifold and a fuel intake manifold; and (b) an exhaust gas recycle reformer fluidly connecting the exhaust manifold and the fuel intake manifold; said reformer comprising a catalyst composition to convert an exhaust gas-containing mixture including recycled exhaust gas from the exhaust manifold and a first hydrocarbon-containing fuel to a reformed gaseous mixture comprising $H_2$, CO, $CO_2$, $H_2O$, $N_2$, and $CH_4$ and having one or more of the following: (i) a Research Octane Number (RON) from 100 to 125; (ii) a $CH_4$ content of greater than about 1.0 mol % based on the number of moles of gas in the reformed fuel mixture; and (iii) a mixture of $H_2$, CO, $CO_2$, $H_2O$, and $CH_4$ characteristic of at least about 50% conversion of the combination of the exhaust gas-containing mixture and the first hydrocarbon-containing fuel in the reforming zone; the fuel intake manifold configured to provide a reformed fuel mixture from the exhaust gas recycle unit and a second hydrocarbon-containing fuel to the internal combustion engine for combustion, wherein the first and second hydrocarbon-containing fuels may be the same or different.

BRIEF DESCRIPTION OF THE DRAWINGS

FIGS. 15A and 15B show graphs of conversion rates and product distributions for conversion of n-heptane in the presence of an exemplary catalyst composition.

DETAILED DESCRIPTION OF THE INVENTION

Figure 1:
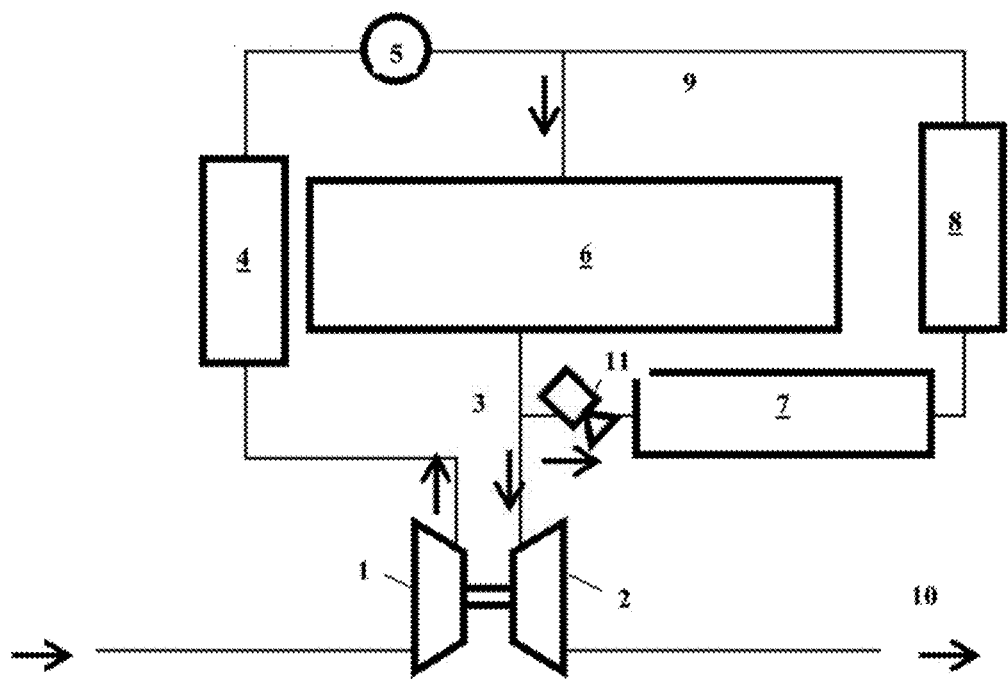
FIG. 1 shows a schematic representation of one embodiment of the powertrain.

In the following description, all numbers disclosed herein are approximate values, regardless whether the word "about" or "approximate" is used in connection therewith. They may vary by 1%, 2%, 5%, and sometimes, 10 to 20%. Whenever a numerical range with a lower limit, $R^L$ and an upper limit, $R^U$, is disclosed, any number falling within the range is specifically disclosed. In particular, the following numbers within the range are expressly disclosed: $R=R^L+ k*(R^U-R^L)$, wherein k is a variable ranging from 1% to 100% with a 1% increment, i.e., k can be 1%, 2%, 3%, 4%, 5%, ..., 50%, 51%, 52%, ..., 95%, 96%, 97%, 98%, 99%, or 100%. Moreover, any numerical range defined by two R numbers as defined in the above is also expressly disclosed. It is noted that for listings of $R^L$ or $R^U$ that begin with "about, e.g.," the presence of about prior to each number is expressly included, but the term about is provided only once in the interest of clarity.

As used herein the terms "substantially free of an oxygen-containing gas" or "does not substantially include providing an oxygen containing gas" mean that an oxygen-containing gas other than the exhaust gas of the internal combustion engine is not purposely provided to the catalytic reforming unit. Additionally or alternatively, these terms can mean that not more than about 0.5 mol % (e.g., not more than about 0.2 mol %, not more than about 0.1 mol %, not more than about 0.05 mol %, or not more than about 0.01 mol %) of the total amount of gas supplied to the reforming unit is an oxygen-containing gas other than the exhaust gas of the internal combustion engine.

Octane ratings described herein generally refer to the Research Octane Number (RON), unless otherwise specified. RON is determined by running the fuel in a test engine with a variable compression ratio under controlled conditions, and comparing the results with those for mixtures of iso-octane and n-heptane.

Overview

In various aspects, the invention is based in part on discovery of a catalyst composition that can effectively convert an internal combustion engine exhaust stream in the presence of a hydrocarbon-containing fuel to a mixture comprising $H_2$, $CO_2$, CO, $H_2O$, $N_2$, and a relatively large amount of methane, $CH_4$. In some aspects, the invention can be further based in part on using thermal cracking and/or catalyzed cracking reactions to convert a portion of the hydrocarbon-containing fuel to higher octane compounds. This can reduce or minimize the amount of heat required to balance the endothermic nature of the reforming reaction. The catalyst composition can produce sufficient amounts of methane in the exothermic methanation reaction to sustain the reformer temperatures for the syngas producing endothermic reforming reaction, such that relatively little or no other heat may need to be added to the reformer to sustain the reforming reaction.

In particular embodiments, the catalyst composition can comprise one or more support materials, e.g., one or more metal oxides, and at least one metal or metal-containing compound. The catalyst composition should typically be capable of catalyzing hydrocarbon reforming and methane formation. The formation of $CH_4$ is typically exothermic, and the heat it produces may be used to supply heat and/or to sustain a reforming reaction to produce synthesis gas or "syngas" that includes hydrogen and carbon monoxide. To improve the overall efficiency of the systems, catalysts may be optimally chosen to accomplish each reaction. Thus, in some embodiments, there may be a first catalyst composition for catalyzing a hydrocarbon reforming reaction for converting a hydrocarbonaceous feed into $CO_2$, CO, $H_2O$, and $H_2$, and a second catalyst composition capable of forming methane, whether directly from the unconverted hydrocarbonaceous feed or from the converted/reformed products. The first and second catalyst compositions may be mixed or they may be segregated within the reformer according to design parameters, e.g., to efficiently distribute and/or transfer heat within the reformer. In some embodiments, the first and second catalyst compositions can be similar or identical (such that effectively a single composition effectively catalyzes both reactions).

In some aspects, the catalyst composition can further include one or more molecular sieves to facilitate and/or catalyze conversion reactions. For example, the one or more molecular sieves can include at least one molecular sieve with activity for catalyzing cracking reactions, such as a medium pore or a large pore molecular sieve. A catalyst composition with additional cracking activity can provide a reaction pathway other than reforming for converting $C_2+$ compounds into smaller molecules. Cracking reactions are typically less endothermic than reforming reactions. As a result, converting at least a portion of a hydrocarbon-containing fuel via cracking instead of reforming can reduce or minimize the amount of additional heat required to maintain the temperature of the reformer.

Additionally or alternately, the one or more molecular sieves can include at least one small pore molecular sieve that can facilitate performing methanation in the reforming environment. The methanation reaction (which converts $H_2$ and CO to methane and water) is effectively the reverse of the reaction for steam reforming of methane. As a result, catalysts that are effective for catalyzing steam reforming of hydrocarbons can generally have activity for performing methanation. However, without being bound by any particular theory, it is believed that the presence of hydrocarbons in the reforming reaction environment can tend to suppress the activity of reforming catalyst for performing the reaction to generate methane. It has been unexpectedly discovered that including a small pore molecular sieve as part of the catalyst composition can enhance the amount of methanation performed in a reforming reaction environment.

In addition (or as an alternative) to using a catalyst composition with cracking activity, cracking of a hydrocarbon-containing fuel can also be performed by using a cylinder in an engine environment to perform thermal cracking of the fuel. After performing the combustion reaction to drive a cylinder in a combustion engine, additional hydrocarbon-containing (or hydrocarbonaceous) fuel can be introduced into the cylinder. This additional fuel can then be cracked using the residual heat present in the cylinder. Instead of venting the exhaust from such a cylinder, the mixture of combustion products and at least partially thermally cracked fuel can be used as at least a portion or potentially all of the fuel for the engine. Because smaller compounds tend to have higher octane ratings, performing thermal cracking on a fuel prior to combustion can increase the overall octane rating of the fuel.

Hydrocarbons and hydrocarbonaceous compounds (such as alcohols) can be reformed, such as by steam reforming, to produce syngas under appropriate conditions in the presence of a reforming catalyst. In an engine or power train environment, reforming can be used to convert hydrocarbon or hydrocarbonaceous compounds into CO and $H_2$. The CO and $H_2$ provide a somewhat higher octane rating and/or flame speed than some components in a typical naphtha boiling range fuel such as C5+ n-alkanes. Additionally, if the reforming catalyst also has activity for forming methane from CO and $H_2$, the methane can serve as a still higher octane rating component in the reformed fuel stream.

Steam reforming is typically an endothermic process, so that additional heat is provided to the reforming process if it is desired to maintain the temperature of the reaction environment. Equation 1 shows the enthalpy of reaction for steam reforming of n-heptane, with the enthalpy expressed per mole of carbon in the fuel.

$$C_7H_{16}+7H_2O \rightarrow 7CO+15H_2 \quad \Delta H(500° C.) \approx 167 \text{ kJ/mol° C.} \tag{1}$$

For reforming processes in an engine or power train environment, additional heat can be provided by combustion of fuel, but this decreases the overall efficiency of the engine. One option for reducing the amount of additional heat required can be to convert a portion of a hydrocarbon fuel by cracking instead of reforming Equation 2 shows the enthalpy of reaction for an example of a cracking reaction for n-heptane. Again, the enthalpy is expressed per mole of carbon in the n-heptane fuel.

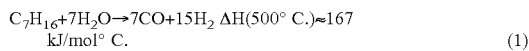
$$CO+3H_2 \rightarrow CH_4+H_2O \quad \Delta H(500° C.) \approx -221 \text{ kJ/mol° C.} \tag{2}$$

In the example cracking reaction shown in Equation 2, n-heptane can be converted into a variety of small alkanes and alkenes with substantially higher octane values. Based on the enthalpy for the cracking reaction, this conversion can typically require less than 10% of the added heat required for reforming on a per carbon basis. By using cracking to convert at least a portion of the fuel, substantially complete conversion of a hydrocarbon-containing fuel can be performed while reducing the amount of additional heat that needs to be provided. The conversion of a portion of a fuel by cracking rather than reforming can be performed by any convenient method. In some embodiments, a fuel can be cracked by thermal cracking prior to reforming. Additionally or alternatively, a fuel can be catalytically cracked in the reformer (or other reaction environment for performing reforming) As a result, a combination of thermal cracking and catalytic cracking can optionally be leveraged.

As noted above, the same catalysts effective for reforming can often also be effective for converting CO and $H_2$ to methane. The formation of methane from CO and $H_2$ is an exothermic process, as shown in Equation 3.

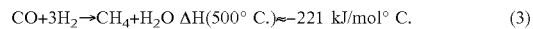
$$CO+3H_2 \rightarrow CH_4+H_2O \quad \Delta H(500° C.) \approx -221 \text{ kJ/mol° C.} \tag{3}$$

As shown in Equation 3, converting CO and $H_2$ in the reforming environment into $CH_4$ can provide a method for further reducing or minimizing the amount of additional heat that needs to be supplied to the reforming reaction zone.

Catalyst Composition—Reforming Components

In various aspects, the catalyst composition can include at least a metal catalyst (or metal-containing catalyst) suitable for reforming of hydrocarbons or hydrocarbon-like compounds. Often the catalyst composition can further include one or more metal oxide components that act as a support for at least a portion of the metal catalyst. The catalyst composition can optionally further include one or more molecular sieves, such as medium pore or large pore molecular sieves with cracking activity. Several embodiments can include a CHA framework type molecular sieve (or another small pore molecular sieve) to provide improved methanation activity. Optionally, at least a portion of the metal catalyst (or metal-containing catalyst) can be supported on the one or more molecular sieves with cracking activity and/or supported on the small pore molecular sieve.

The one or more metal oxide components may be selected from any suitable metal oxide(s). Exemplary metal oxides can include, but are not necessarily limited to, aluminum oxides, silicon oxides, rare-earth metal oxides, Group IV metal oxides (e.g., $Al_2O_3$, including $\theta$-$Al_2O_3$ and/or $\gamma$-$Al_2O_3$), $SiO_2$, $Y_2O_3$, $Sc_2O_3$, $La_2O_3$, $CeO_2$, $Pr_2O_3$ $Sm_2O_3$ $Eu_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$, $TiO_2$, $ZrO_2$, $HfO_2$, and mixtures thereof. For example, embodiments of a metal oxide mixture suitable for use in the catalyst compositions herein may include from about 1.0 wt % to about 99.0 wt %, based on the total weight of the catalyst composition, of a first metal oxide. The lower limit on the range of first metal oxide content may be about, e.g., 1.0 wt %, 2.0 wt %, 5.0 wt %, 7.5 wt %, 10.0 wt %, 12.5 wt %, 15.0 wt %, 17.5 wt %, 20.0 wt %, 22.5 wt %, 25.0 wt %, 27.5 wt %, 30.0 wt %, 32.5 wt %, 35.0 wt %, 37.5 wt %, 40.0 wt %, 42.5 wt %, 45.0 wt %, 47.5 wt %, 50.0 wt %, 52.5 wt %, 55.0 wt %, 57.5 wt %, 60.0 wt %, 62.5 wt %, 65.0 wt %, 67.5 wt %, 70.0 wt %, 72.5 wt %, 75.0 wt %, 77.5 wt %, 80.0 wt %, 82.5 wt %, 85.0 wt %, 90.0 wt %, 92.5 wt %, 95.0 wt %, or 97.5 wt %. The upper limit on the range of first metal oxide content may be about, e.g., 2.0 wt %, 5.0 wt %, 7.5 wt %, 10.0 wt %, 12.5 wt %, 15.0 wt %, 17.5 wt %, 20.0 wt %, 22.5 wt %, 25.0 wt %, 27.5 wt %, 30.0 wt %, 32.5 wt %, 35.0 wt %, 37.5 wt %, 40.0 wt %, 42.5 wt %, 45.0 wt %, 47.5 wt %, 50.0 wt %, 52.5 wt %, 55.0 wt %, 57.5 wt %, 60.0 wt %, 62.5 wt %, 65.0 wt %, 67.5 wt %, 70.0 wt %, 72.5 wt %, 75.0 wt %, 77.5 wt %, 80.0 wt %, 82.5 wt %, 85.0 wt %, 90.0 wt %, 92.5 wt %, 95.0 wt %, 97.5 wt %, or 99.0 wt %. Combinations of such lower and upper limits may be selected, e.g., from about 2.5 wt % to about 95.0 wt %, from about 5.0 wt % to about 80.0 wt %, from about 10.0 wt % to about 55.0 wt %, from about 20.0 wt % to about 40.0 wt %, etc. A second metal oxide may optionally be present in an amount from about 1.0 wt % to about 99.0 wt %. The lower limit on the range of second metal oxide content may be about, e.g., 1.0 wt %, 2.0 wt %, 5.0 wt %, 7.5 wt %, 10.0 wt %, 12.5 wt %, 15.0 wt %, 17.5 wt %, 20.0 wt %, 22.5 wt %, 25.0 wt %, 27.5 wt %, 30.0 wt %, 32.5 wt %, 35.0 wt %, 37.5 wt %, 40.0 wt %, 42.5 wt %, 45.0 wt %, 47.5 wt %, 50.0 wt %, 52.5 wt %, 55.0 wt %, 57.5 wt %, 60.0 wt %, 62.5 wt %, 65.0 wt %, 67.5 wt %, 70.0 wt %, 72.5 wt %, 75.0 wt %, 77.5 wt %, 80.0 wt %, 82.5 wt %, 85.0 wt %, 90.0 wt %, 92.5 wt %, 95.0 wt %, or 97.5 wt %. The upper limit on the range of second metal oxide content may be about, e.g., 2.0 wt %, 5.0 wt %, 7.5 wt %, 10.0 wt %, 12.5 wt %, 15.0 wt %, 17.5 wt %, 20.0 wt %, 22.5 wt %, 25.0 wt %, 27.5 wt %, 30.0 wt %, 32.5 wt %, 35.0 wt %, 37.5 wt %, 40.0 wt %, 42.5 wt %, 45.0 wt %, 47.5 wt %, 50.0 wt %, 52.5 wt %, 55.0 wt %, 57.5 wt %, 60.0 wt %, 62.5 wt %, 65.0 wt %, 67.5 wt %, 70.0 wt %, 72.5 wt %, 75.0 wt %, 77.5 wt %, 80.0 wt %, 82.5 wt %, 85.0 wt %, 90.0 wt %, 92.5 wt %, 95.0 wt %, 97.5 wt %, or 99.0 wt %. Combinations of such lower and upper limits may be selected, e.g., from about 97.5 wt % to about 5.0 wt %, from about 95.0 wt % to about 20.0 wt %, from about 90.0 wt % to about 45.0 wt %, from about 80.0 wt % to about 60.0 wt %, etc.

In particular embodiments, the first metal oxide may itself be a mixture of oxides disclosed herein. For example, in an embodiment, the first metal oxide is a mixture of $La_2O_3$ and $\gamma$-$Al_2O_3$. For a mixture of $La_2O_3$ and $\gamma$-$Al_2O_3$, or more generally for a mixture of $La_2O_3$ and $Al_2O_3$, the $La_2O_3$ can correspond to about 0.4 wt % to about 20 wt % of the combined weight of $La_2O_3$ and $Al_2O_3$. For example, the $La_2O_3$ can correspond to at least about 0.4 wt % of the combined weight of $La_2O_3$ and $\gamma$-$Al_2O_3$, or at least about 1.0 wt %, or at least about 2.0 wt %, or at least about 5.0 wt %, or at least about 10.0 wt %, and/or about 20.0 wt % or less, or about 15.0 wt % or less, or about 10.0 wt % or less, or about 5.0 wt % or less, or about 2.0 wt % or less. It is noted that all combinations for the upper and lower limit of the amount of $La_2O_3$ relative to the combined amount of $La_2O_3$ and $Al_2O_3$ are expressly contemplated herein. The amount of the $La_2O_3$ and $\gamma$-$Al_2O_3$ together may be, for example, from about 20.0 wt % to about 90.0 wt %, such as from about 30.0 wt % to about 50.0 wt % or from about 32.5 wt % to about 37.5 wt %, based on the total weight of the catalyst composition. Optionally, in such embodiments, the second metal oxide may itself also be a mixture of oxides disclosed herein. For example, the second metal oxide may comprise $CeO_2$ and $ZrO_2$. The amount of the $CeO_2$ and $ZrO_2$ together may be, for example, from about 10.0 wt % to about 80.0 wt %, such as from about 15.0 wt % to about 70.0 wt % or from about 20.0 wt % to about 65.0 wt %, or from about 30.0 wt % to about 60.0 wt %, or from about 40.0 wt % to about 80.0 wt %, based on the total weight of the catalyst composition. The Ce:Zr atomic ratio may be about, e.g., 10:0.5, 7.5:0.5, 5.0:1.0, 4.0:1.0, 3.0:1.0, 2.0:1.0, 1.0:1.0, or the like, or anywhere therewithin.

The at least one metal or metal-containing hydrocarbon reforming catalyst may be selected from the group consisting of Co, Ru, Rh, Pt, Pd, Fe, Ni, Ir, Zn, Re, and mixtures thereof. It will be understood that reference to the presence of such metals envisions their presence in elemental/and or compound form. Thus, amounts of such compounds refer to the total amount of metal, in the form or metal or in compound form, based on the total weight of the catalyst composition. The amount of metal-containing hydrocarbon reforming catalyst may range from about 1.0 wt % to about 50 wt %. The lower limit on the range of hydrocarbon reforming catalyst may be about, e.g., 1.0 wt %, 2.0 wt %, 5.0 wt %, 7.5 wt %, 10.0 wt %, 12.5 wt %, 15.0 wt %, 17.5 wt %, 20.0 wt %, 22.5 wt %, 25.0 wt %, 27.5 wt %, 30.0 wt %, 32.5 wt %, 35.0 wt %, 37.5 wt %, 40.0 wt %, 42.5 wt %, 45.0 wt %, 47.5 wt %, or 50.0 wt %. The upper limit on the range of metal-containing hydrocarbon reforming catalyst content may be about, e.g., 1.0 wt %, 5.0 wt %, 7.5 wt %, 10.0 wt %, 12.5 wt %, 15.0 wt %, 17.5 wt %, 20.0 wt %, 22.5 wt %, 25.0 wt %, 27.5 wt %, 30.0 wt %, 32.5 wt %, 35.0 wt %, 37.5 wt %, 40.0 wt %, 42.5 wt %, 45.0 wt %, 47.5 wt %, 50.0 wt %. Combinations of such lower and upper limits may be selected, e.g., from about 1.0 wt % to about 20.0 wt %, from about 2.5 wt % to about 17.5 wt %, from about 5.0 wt % to about 15.0 wt %, from about 7.5 wt % to about 10.0 wt %, from about 1.0 wt % to about 10.0 wt %, from about 2.0 wt % to about 9.5 wt %, from about 2.5 wt % to about 9.0 wt %, from about 3.0 wt % to about 8.0 wt %, from about 4.0 wt % to about 7.7. wt %, etc., based on the total weight of the catalyst composition.

Exemplary embodiments of suitable hydrocarbon reforming catalysts of the catalyst compositions herein may include two or more such hydrocarbon reforming catalysts. For example, the catalyst composition may include a non-zero amount up to about 20 wt %, based on the total weight of the catalyst composition, of a first hydrocarbon reforming catalyst. The lower limit on the range of first hydrocarbon reforming catalyst content may be about, e.g., 0.25 wt %, 0.50 wt %, 0.75 wt %, 1.0 wt %, 2.0 wt %, 2.5 wt %, 3.0 wt %, 4.0 wt %, 5.0 wt %, 7.5 wt %, 10.0 wt %, 12.5 wt %, 15.0 wt %, 17.5 wt %, or 20.0 wt %. The upper limit on the range of first hydrocarbon reforming catalyst content may be about, e.g., 0.50 wt %, 0.75 wt %, 1.0 wt %, 2.0 wt %, 2.5 wt %, 3.0 wt %, 4.0 wt %, 5.0 wt %, 7.5 wt %, 10.0 wt %, 12.5 wt %, 15.0 wt %, 17.5 wt %, or 20.0 wt %. Combinations of such lower and upper limits may be selected, e.g., from about 0.5 wt % to about 15.0 wt %, from about 1.0 wt % to about 10.0 wt %, from about 2.0 wt % to about 7.5 wt %, from about 2.5 wt % to about 5.0 wt %, etc. A second hydrocarbon reforming catalyst also may be present in an amount of >0 to about 20.0 wt %, based on the total weight of the catalyst composition. The lower limit on the range of second hydrocarbon reforming catalyst content may be about, e.g., 0.25 wt %, 0.50 wt %, 0.75 wt %, 1.0 wt %, 2.0 wt %, 2.5 wt %, 3.0 wt %, 4.0 wt %, 5.0 wt %, 7.5 wt %, 10.0 wt %, 12.5 wt %, 15.0 wt %, 17.5 wt %, or 20.0 wt %. The upper limit on the range of second hydrocarbon reforming catalyst content may be about, e.g., 0.50 wt %, 0.75 wt %, 1.0 wt %, 2.0 wt %, 2.5 wt %, 3.0 wt %, 4.0 wt %, 5.0 wt %, 7.5 wt %, 10.0 wt %, 12.5 wt %, 15.0 wt %, 17.5 wt %, or 20.0 wt %. Combinations of such lower and upper limits may be selected, e.g., from about 0.5 wt % to about 15.0 wt %, from about 1.0 wt % to about 10.0 wt %, from about 2.0 wt % to about 7.5 wt %, from about 2.5 wt % to about 5.0 wt %, from about 0.75 wt % to about 2.0 wt %, etc. In exemplary hydrocarbon reforming catalysts, the first hydrocarbon reforming catalyst can include or be Rh and the second hydrocarbon reforming catalyst can include or be Pt, e.g., such that the hydrocarbon reforming catalyst comprises from about 1.0 wt % to about 6.0 wt % Rh, from about 1.5 wt % to about 5.0 wt %, from about 2.0 wt % to about 4.5 wt %, from about 2.5 wt % to about 4.0 wt % Rh and from about 0.5 wt % to about 5.0 wt % Pt, from about 0.75 wt % to about 3.0 wt %, or from about 1.0 to about 2.0 wt % Pt, based on the total weight of the catalyst composition.

In some aspects, the catalyst composition comprising the support (e.g., metal oxide(s)) and hydrocarbon reforming catalyst(s), and optionally any molecular sieves, can comprise >~80.0 wt % (e.g., >~82.5 wt %, >~85.0 wt %, >~87.5 wt %, >~90.0 wt %, >~92.5 wt %, >~95.0 wt %, from about 82.5 wt % to about 100.0 wt %, from about 85.0 wt % to about 99.0 wt %, from about 87.5 wt % to about 95.0 wt %) of particles having a size of 20-100 mesh (U.S.) (e.g., 25-90 mesh, 30-85 mesh, or 35-80 mesh). A more particular description for indicating particle size distribution using mesh size can be to use + and − designations. A "+" before the sieve mesh indicates the particles are retained by the sieve, while a "−" before the sieve mesh indicates the particles pass through the sieve. This means that typically ~90% or more (e.g., ~95% or more, ~96% or more, ~97% or more, ~98% or more, ~99% or more, ~99.5% or more, or ~99.9% or more) of the particles will have mesh sizes between the two values. For instance, if the particle size of a material is described as ~80/+170, then ~90% or more of the material will pass through an 80 mesh sieve and be retained by a 170 mesh sieve. Thus, in some embodiments, the catalyst composition may have a particle size distribution of −20/+100 mesh, e.g., −25/+90 mesh, −30/+85 mesh, or −35/+80 mesh. It should be noted that the particle size range specified above pertains to the particular test reactor that was utilized for some of the catalytic test of catalysts described herein. The preferred particle size range can change for different reactors and/or converter embodiments used in a vehicle application.

Another optional way of describing particle size distribution refers to respective percentiles of log normal particle size distribution determined by means of a Malvern™ particle size analyzer using a hexane diluent. Thus, particles having a $D_{50}$ of, for example, 0.5 mm have a median particle size of ~0.5 mm. A $D_{90}$ of 0.5 mm indicates that ~90% of the particles have a particle size of less than ~0.5 mm, and a $D_{10}$ of 0.5 mm indicates that ~10% of the particles have a particle size of less than ~0.5 mm. The width or narrowness of a particle size distribution can be given by its span. The span is defined as $(D_{90}-D_{10})/(D_{50})$ and is therefore dimensionless. In some embodiments, the catalyst composition may be characterized as having a $D_{50}$ from ~0.15 mm to ~1.0 mm (e.g., from ~0.85 mm to ~0.16 mm, from ~0.60 mm to ~0.17 mm, or from ~0.50 mm to ~0.20 mm) and/or as having a span from about ~0.5 to about ~10, e.g., from ~1.0 to ~6.0, from ~2.0 to ~5.0, or from ~3.0 to ~4.0.

In certain embodiments, a reforming and/or cracking and/or methanation catalyst as described herein can be provided in a reformer (or other reaction environment) in the form of a washcoated monolithic converter. This type of catalyst embodiment for providing a supported catalyst is commonly used for automotive converters. In such embodiments, the catalyst composition can deposited on or otherwise supported on a flow through substrate with parallel or tortuous channels. The reactive gases can enter a plurality of channels at the front end of the converter and exit the same channels at the rear end of the converter. In certain embodiments used, for example, for particulate filtration on diesel engines, half of the channels of the monolith can be plugged on the inlet side of the monolith and the alternate half of the channels can be plugged on the outlet side of the substrate. In this so-called wall flow substrate, the exhaust can enter the portion of the channel system that is open on the inlet side. At least a portion of the exhaust can then pass through the walls of the porous substrate and exit the substrate through the other half of the channel system. The monolith substrate can be made of, for example, ceramic or metal. Ceramic substrate materials include cordierite, SiC, alumina, titania and other oxides or mixtures of oxides. The catalyst can typically be supported on the substrate in the form of a washcoat. An example of the preparation and application washcoats for monolithic catalysts is described in the literature "Catalytic Air Pollution" by Ronald M. Heck and Robert J. Farrauto published by Van Nostrand Reinhold, 1995. The preparation of a monolith substrate typically includes the preparation of a slurry containing the catalyst powder and typically a binder material suspended in a liquid phase. The catalyst containing slurry can then be washcoated onto the substrate. The washcoated substrate can then be subsequently dried and calcined in air or annealed in specified gas environments.

Catalyst Composition—Optional Cracking Component

In some situations, the catalyst composition can further include one or more molecular sieves, such as one or more zeolites that provide cracking activity. Any convenient molecular sieve with cracking activity can be used. For example, a molecular sieve with cracking activity such as ZSM-5 or MCM-68 can be beneficial in some catalyst compositions. Other suitable molecular sieves can include medium pore and/or large pore molecular sieves. In some alternative embodiments, instead of including an aluminosilicate type molecular sieve to provide cracking activity, a silicoaluminophosphate molecular sieve or an aluminophosphate molecular sieve can be included in the catalyst composition.

For molecular sieve(s) with cracking activity, the molecular sieve(s) can correspond to about 1.0 wt % to about 99.75 wt %, based on the total weight of the catalyst composition. The lower limit on the range of the one or more molecular sieves added to the catalyst composition may be about, e.g., 1.0 wt %, 2.0 wt %, 5.0 wt %, 7.5 wt %, 10.0 wt %, 12.5 wt %, 15.0 wt %, 17.5 wt %, 20.0 wt %, 22.5 wt %, 25.0 wt %, 27.5 wt %, 30.0 wt %, 32.5 wt %, 35.0 wt %, 37.5 wt %, 40.0 wt %, 42.5 wt %, 45.0 wt %, 47.5 wt %, 50.0 wt %, 52.5 wt %, 55.0 wt %, 57.5 wt %, 60.0 wt %, 62.5 wt %, 65.0 wt %, 67.5 wt %, 70.0 wt %, 72.5 wt %, 75.0 wt %, 77.5 wt %, 80.0 wt %, 82.5 wt %, 85.0 wt %, 90.0 wt %, 92.5 wt %, 95.0 wt %, or 97.5 wt %. The upper limit on the range of the one or more molecular sieves added to the catalyst composition may be about, e.g., 2.0 wt %, 5.0 wt %, 7.5 wt %, 10.0 wt %, 12.5 wt %, 15.0 wt %, 17.5 wt %, 20.0 wt %, 22.5 wt %, 25.0 wt %, 27.5 wt %, 30.0 wt %, 32.5 wt %, 35.0 wt %, 37.5 wt %, 40.0 wt %, 42.5 wt %, 45.0 wt %, 47.5 wt %, 50.0 wt %, 52.5 wt %, 55.0 wt %, 57.5 wt %, 60.0 wt %, 62.5 wt %, 65.0 wt %, 67.5 wt %, 70.0 wt %, 72.5 wt %, 75.0 wt %, 77.5 wt %, 80.0 wt %, 82.5 wt %, 85.0 wt %, 90.0 wt %, 92.5 wt %, 95.0 wt %, 97.5 wt %, or 99.0 wt %, or 99.5 wt %, or 99.75 wt %. Combinations of such lower and upper limits may be selected and are expressly considered herein, e.g., from about 2.5 wt % to about 95.0 wt %, from about 5.0 wt % to about 80.0 wt %, from about 10.0 wt % to about 55.0 wt %, from about 20.0 wt % to about 40.0 wt %, etc.

In certain embodiments, the one or more molecular sieve(s) can correspond to at least one medium pore aluminosilicate zeolite having a Constraint Index of 1-12 (as defined in U.S. Pat. No. 4,016,218). Suitable zeolites can include zeolites having an MFI or MEL framework, such as ZSM-5 or ZSM-11. ZSM-5 is described in detail in U.S. Pat. Nos. 3,702,886 and RE 29,948. ZSM-11 is described in detail in U.S. Pat. No. 3,709,979. Preferably, the zeolite is ZSM-5. Other useful medium pore molecular sieves can include ZSM-12 (U.S. Pat. No. 3,832,449); ZSM-22 (U.S. Pat. No. 4,556,477); ZSM-23 (U.S. Pat. No. 4,076,842); ZSM-34 (U.S. Pat. No. 4,086,186) ZSM-35 (U.S. Pat. No. 4,016,245); ZSM-48 (U.S. Pat. No. 4,397,827); and ZSM-57 (U.S. Pat. No. 4,873,067). Non-limiting examples of SAPO and AlPO molecular sieves can include one or a combination of SAPO-11, SAPO-31, SAPO-41, AlPO-11, AlPO-31, AlPO-41, and PST-6. The molecular sieve(s) can additionally or alternatively comprise or be at least one large pore aluminosilicate, aluminophosphate, or silicoaluminophosphate zeolite containing 12-ring pores. Suitable large pore molecular sieves can include those having AFI, AFS, ATO, ATS, *BEA, BEC, BOG, BPH, CAN, CON, EMT, EON, EZT, FAU, GME, GON, IFR, ISV, -*ITN, IWR, IWW, LTL, MAZ, MEI, MOR, MOZ, MSE, MTW, OFF, OKO, OSI, SAF, SAO, SEW, SFE, SFO, SSF, SSY, and USI frameworks.

An additional or alternative option for characterizing a zeolite (or other molecular sieve) is based on the nature of the ring channels in the zeolite. The ring channels in a zeolite can be defined based on the number of tetrahedral framework atoms including in the ring structure that forms the channel. In some aspects, a zeolite can include at least one ring channel based on a 10-member ring. In such aspects, the zeolite preferably does not have any ring channels based on a ring larger than a 10-member ring. Examples of suitable framework structures having a 10-member ring channel but not having a larger size ring channel include EUO, FER, HEU, IFW, ITH, IMF, LAU, MEL, MFI, MFS, MTT, MVY, MWW, NES, PCR, PON, RRO, SFF, SFG, *SFV, STF, -SVR, STI, SZR, TON, TUN, and MRE.

Generally, a zeolite having the desired activity can have a silicon to aluminum molar ratio of about 2 to about 300, such as about 5 to about 100 or about 20 to about 40. For example, the silicon to aluminum ratio can be at least about 2, such as at least about 5, or at least about 10, or at least about 40, or at least about 50, or at least about 60. Additionally or alternatively, the silicon to aluminum ratio can be about 300 or less, such as about 200 or less, or about 100 or less, or about 80 or less, or about 60 or less, or about 50 or less.

Additionally or alternatively, the one or more molecular sieves in the catalyst composition can also include and/or be enhanced by a transition metal. The transition metal can be incorporated into the zeolite by any convenient method, such as by impregnation or by ion exchange. If the transition metal is added to the molecular sieve(s) prior to incorporating the molecular sieve(s) into the catalyst composition, the amount of transition metal can be expressed as a weight percentage of the one or more molecular sieves, such as having at least about 0.1 wt % of transition metal, or at least about 0.25 wt %, or at least about 0.5 wt %, or at least about 0.75 wt %, or at least about 1.0 wt %. Additionally or alternatively, the amount of transition metal can be about 20 wt % or less, such as about 10 wt % or less, or about 5 wt % or less, or about 2.0 wt % or less, or about 1.5 wt % or less, or about 1.2 wt % or less, or about 1.1 wt % or less, or about 1.0 wt % or less. It is noted that the amount of transition metal is in addition to the weight of metal or metal-containing reforming catalyst in the catalyst composition.

Further additionally or alternatively, the one or more molecular sieves can include non-framework phosphorus and/or be enhanced by phosphorus treatment. Including phosphorus in the additional molecular sieve can potentially provide increased stability for the molecular sieve(s) in the reaction conditions present during reforming and/or methanation as described herein. The weight of the phosphorus can be about 0.1 wt % to about 10.0 wt % based on the weight of the additional molecular sieve. Thus, the upper limit on the range of the phosphorus added to the one or more molecular sieves may be 10.0 wt %, 9.0 wt %, 8.0 wt %, 7.0 wt %, 6.0 wt %, 5.0 wt %, 4.0 wt %, 3.0 wt %, 2.0 wt %, 1.0 wt %, or 0.1 wt %; and the lower limit on the range added to the additional molecular sieve may be 10.0 wt %, 9.0 wt %, 8.0 wt %, 7.0 wt %, 6.0 wt %, 5.0 wt %, 4.0 wt %, 3.0 wt %, 2.0 wt %, 1.0 wt %, or 0.1 wt %. Ranges expressly disclosed include combinations of any of the above-enumerated upper and lower limits; e.g., 0.1 to 10.0 wt %, 0.1 to 8.0 wt %, 0.1 to 6.0 wt %, 0.1 to 5.0 wt %, 0.1 to 4.0 wt %, 0.1 to 3.0 wt %, 0.1 to 2.0 wt %, 0.1 to 1.0 wt %, 1.0 to 10.0 wt %, 1.0 to 9.0 wt %, 1.0 to 8.0 wt %, 1.0 to 7.0 wt %, 1.0 to 6.0 wt %, 1.0 to 5.0 wt %, 1.0 to 4.0 wt %, 1.0 to 3.0 wt %, etc. Of course, these total weights of the phosphorus shall be understood to exclude any phosphorus in the molecular sieve framework.

In embodiments where one or more molecular sieves are included in the catalyst composition, at least a portion of the metal catalyst(s) for reforming can be supported on the molecular sieve(s), or all of the metal catalyst(s) for reforming can be supported on the metal oxides.

Catalyst Composition—Optional Methanation Component

Additionally or alternatively, a small pore molecular sieve can be beneficial in the catalyst composition, such as a zeolite having the CHA framework type. In such additional or alternative embodiments, at least a portion of the metal or metal-containing catalyst can be supported on the small pore molecular sieve. In some embodiments, the metal or metal-containing catalyst supported on the small pore molecular sieve can be rhodium. Supporting at least a portion of the (reforming) metal or metal-containing catalyst on the small pore molecular sieve can enhance the production of methane (via methanation) in the reforming environment.

In this discussion, unless specifically noted otherwise, references to CHA framework type zeolites are understood to generally refer to any zeolite (or other molecular sieve) having the chabazite framework type. The chabazite framework type is designated as framework type code CHA in the International Zeolite Association database of zeolite structures. Other zeolites having the CHA framework type can include AlPO-34, MCM-2, MeAPO-44, MeAPO-47, SAPO-34, SAPO-47, SSZ-13, SSZ-62, and ZK-14. Chabazite can refer to a naturally occurring or a synthetic form of chabazite. Unless otherwise specified, a reference to chabazite should be understood to generally refer to the zeolite chabazite (natural or synthetic), optionally containing any of the potential various counterions and/or additional metals that can be present.

While rhodium supported on CHA framework type molecular sieve of the present invention can effectively enhance the formation of methane, additional rhodium supported multi-dimensional small pore molecular sieves can also be effective. Suitable small pore molecular sieves can include those having the AEI, AFT, AFX, ATT, DDR, EAB, EPI, ERI, KFI, LEV, LTA, MER, MON, MTF, PAU, PHI, RHO, and SFW framework types, as well as combinations thereof.

An additional or alternative option for characterizing small pore molecular sieves can be based on the ring structures in the molecular sieves. Some suitable small pore molecular sieves can include molecular sieves having an 8-member ring channel as the largest pore size for the molecular sieve.

Still another additional or alternative option for characterizing small pore molecular sieves can be based on the effective size of the pore channels. Some typical small pore molecular sieves can include molecular sieves with a largest pore channel having a maximum dimension of about 5.0 Angstroms or less. A molecular sieve having elliptical pores with a slightly larger maximum dimension of about 5.1 Angstroms or about 5.2 Angstroms along the major axis may still correspond to a small pore molecular sieve if the minor axis has a dimension of about 4.0 Angstroms or less. In still other aspects, a suitable small pore molecular sieve can include a largest pore channel that has a maximum dimension of about 4.8 Angstroms or less, e.g., about 4.7 Angstroms or less, about 4.6 Angstroms or less, about 4.5 Angstroms or less, about 4.4 Angstroms or less, or about 4.3 Angstroms or less. In such a molecular sieve, the largest pore channel can also have a minimum dimension of at least about 3.5 Angstroms, e.g., at least about 3.6 Angstroms or at least about 3.7 Angstroms. In this discussion, the maximum and minimum dimensions of a pore channel for a molecular sieve refer to the size of a sphere that can diffuse through such a pore channel, as reported in the Database of Zeolite Structures that is maintained by the International Zeolite Association.

In various aspects, the weight of the CHA framework type molecular sieve (or small pore molecular sieve) in the catalyst composition, and/or the weight of chabazite in the catalyst composition, can be from about 1.0 wt % to about 99.75 wt %, based on the total weight of the catalyst composition. The lower limit on the range of CHA framework type molecular sieve (or small pore molecular sieve) content, and/or the lower limit on the chabazite content, may be about, e.g., 1.0 wt %, 2.0 wt %, 5.0 wt %, 7.5 wt %, 10.0 wt %, 12.5 wt %, 15.0 wt %, 17.5 wt %, 20.0 wt %, 22.5 wt %, 25.0 wt %, 27.5 wt %, 30.0 wt %, 32.5 wt %, 35.0 wt %, 37.5 wt %, 40.0 wt %, 42.5 wt %, 45.0 wt %, 47.5 wt %, 50.0 wt %, 52.5 wt %, 55.0 wt %, 57.5 wt %, 60.0 wt %, 62.5 wt %, 65.0 wt %, 67.5 wt %, 70.0 wt %, 72.5 wt %, 75.0 wt %, 77.5 wt %, 80.0 wt %, 82.5 wt %, 85.0 wt %, 90.0 wt %, 92.5 wt %, 95.0 wt %, or 97.5 wt %. The upper limit on the range of CHA framework type molecular sieve (or small pore molecular sieve) content, and/or the lower limit on the chabazite content, may be about, e.g., 2.0 wt %, 5.0 wt %, 7.5 wt %, 10.0 wt %, 12.5 wt %, 15.0 wt %, 17.5 wt %, 20.0 wt %, 22.5 wt %, 25.0 wt %, 27.5 wt %, 30.0 wt %, 32.5 wt %, 35.0 wt %, 37.5 wt %, 40.0 wt %, 42.5 wt %, 45.0 wt %, 47.5 wt %, 50.0 wt %, 52.5 wt %, 55.0 wt %, 57.5 wt %, 60.0 wt %, 62.5 wt %, 65.0 wt %, 67.5 wt %, 70.0 wt %, 72.5 wt %, 75.0 wt %, 77.5 wt %, 80.0 wt %, 82.5 wt %, 85.0 wt %, 90.0 wt %, 92.5 wt %, 95.0 wt %, 97.5 wt %, or 99.0 wt %, or 99.5 wt %, or 99.75 wt %. Combinations of such lower and upper limits may be selected, e.g., from about 2.5 wt % to about 95.0 wt %, from about 5.0 wt % to about 80.0 wt %, from about 10.0 wt % to about 55.0 wt %, from about 20.0 wt % to about 40.0 wt %, etc.

In embodiments where the catalyst composition also includes one or more metal oxides, the catalyst composition can include at least a minimum amount of chabazite (and/or a CHA framework type zeolite or other small pore molecular sieve) such as any of the lower limit amounts described above.

In some embodiments, the metal or metal-containing catalyst in a catalyst composition including a small pore molecular sieve can be any of the metal or metal-containing catalysts described above in the amounts as described above. This can include aspects where the metal or metal-containing catalyst is Rh or includes Rh. Alternatively, a first metal or metal-containing catalyst can be supported on the metal oxide support portion of the catalyst composition while a second metal or metal-containing catalyst, preferably Rh, is supported on the small pore molecular sieve. In such aspects, if any medium or large pore molecular sieves are also included in the catalyst composition, the medium or large pore molecular sieves can support no metal or metal-containing catalyst, or support a portion of the metal or metal-containing catalyst present on the metal oxide support, or support a portion of the metal or metal-containing catalyst present on the small pore molecular sieve, or a combination thereof.

In embodiments where different metal or metal-containing catalysts are supported on the metal oxide portion and the small pore molecular sieve portion of a catalyst composition, the total amount of metals in the catalyst composition can correspond to any convenient combination of an amount of metal or metal-containing catalyst supported on the small pore molecular sieve and an amount of metal or metal-containing catalyst supported on the metal oxide support. As an example, a catalyst composition may include Rh as a reforming metal catalyst on the small pore molecular sieve portion of the catalyst composition while including Ru on the metal oxide support portion of the catalyst composition. For example, the catalyst composition may include a non-zero amount up to about 20 wt %, based on the total weight of the catalyst composition, of a first metal or metal-containing compound(s) such as Rh and/or an Rh-containing compound (or other metal selected from Co, Ru, Rh, Pt, Pd, Fe, Ni, Ir, Zn, Re, and combinations thereof that is supported on the small pore molecular sieve). The lower limit on the range of the first metal content may be about, e.g., 0.25 wt %, 0.50 wt %, 0.75 wt %, 1.0 wt %, 2.0 wt %, 2.5 wt %, 3.0 wt %, 4.0 wt %, 5.0 wt %, 7.5 wt %, 10.0 wt %, 12.5 wt %, 15.0 wt %, 17.5 wt %, or 20.0 wt %. The upper limit on the range of the first metal content may be about, e.g., 0.50 wt %, 0.75 wt %, 1.0 wt %, 2.0 wt %, 2.5 wt %, 3.0 wt %, 4.0 wt %, 5.0 wt %, 7.5 wt %, 10.0 wt %, 12.5 wt %, 15.0 wt %, 17.5 wt %, or 20.0 wt %. Combinations of such lower and upper limits may be selected, e.g., from about 0.5 wt % to about 15.0 wt %, from about 1.0 wt % to about 10.0 wt %, from about 2.0 wt % to about 7.5 wt %, from about 2.5 wt % to about 5.0 wt %, etc. The catalyst supported on the metal oxide support portion of the catalyst composition may also may be present in an amount of >0 to about 20.0 wt %, based on the total weight of the catalyst composition. The lower limit on the range of catalyst supported on the metal oxide support may be about, e.g., 0.25 wt %, 0.50 wt %, 0.75 wt %, 1.0 wt %, 2.0 wt %, 2.5 wt %, 3.0 wt %, 4.0 wt %, 5.0 wt %, 7.5 wt %, 10.0 wt %, 12.5 wt %, 15.0 wt %, 17.5 wt %, or 20.0 wt %. The upper limit on the range of catalyst supported on the metal oxide support may be about, e.g., 0.50 wt %, 0.75 wt %, 1.0 wt %, 2.0 wt %, 2.5 wt %, 3.0 wt %, 4.0 wt %, 5.0 wt %, 7.5 wt %, 10.0 wt %, 12.5 wt %, 15.0 wt %, 17.5 wt %, or 20.0 wt %. Combinations of such lower and upper limits may be selected, e.g., from about 0.5 wt % to about 15.0 wt %, from about 1.0 wt % to about 10.0 wt %, from about 2.0 wt % to about 7.5 wt %, from about 2.5 wt % to about 5.0 wt %, from about 0.75 wt % to about 2.0 wt %, etc. For example, an Rh or an Rh-containing compound may be supported on a small pore molecular sieve portion of the catalyst composition while Ru or an Ru-containing compound may be supported on the metal oxide portion of the catalyst composition, e.g., such that the catalyst composition comprises from about 1.0 wt % to about 6.0 wt % Rh, from about 1.5 wt % to about 5.0 wt %, from about 2.0 wt % to about 4.5 wt %, or from about 2.5 wt % to about 4.0 wt % Rh and from about 0.5 wt % to about 5.0 wt % Ru, from about 0.75 wt % to about 3.0 wt %, or from about 1.0 wt % to about 2.0 wt % Ru, based on the total weight of the catalyst composition.

Reforming, Cracking, and Methanation in an Engine or Power Train Environment

The catalyst composition can advantageously be suitable for providing a sufficient amount of heat to sustain the reforming reaction to produce syngas containing hydrogen. This can include aspects where the heat for sustaining the reforming reaction is reduced or minimized by cracking a portion of a fuel by catalytic cracking, thermal cracking, or a combination thereof. Typically, the catalyst composition can provide, e.g., greater than about 0.25 mol % $CH_4$, such as from about 0.25 mol % to about 10.0 mol % $CH_4$, or from about 0.25 mol % to about 6.0 mol % $CH_4$, or from about 0.25 mol % to about 5 mol % $CH_4$, or from about 0.25 mol % to about 4.0 mol % $CH_4$, or from about 0.4 mol % to about 10.0 mol % $CH_4$, or from about 0.4 mol % to about 6.0 mol % $CH_4$, or from about 0.4 mol % to about 5 mol % $CH_4$, or from about 0.4 mol % to about 4.0 mol % $CH_4$, or from about 0.5 mol % to about 10.0 mol % $CH_4$, or from about 0.5 mol % to about 6.0 mol % $CH_4$, or from about 0.5 mol % to about 5 mol % $CH_4$, or from about 0.5 mol % to about 4.0 mol % $CH_4$, or from about 1.0 mol % to about 10.0 mol % $CH_4$, or from about 1.0 mol % to about 6.0 mol % $CH_4$, or from about 1.0 mol % to about 5 mol % $CH_4$, or from about 1.0 mol % to about 4.0 mol % $CH_4$, or from about 1.5 mol % to about 10.0 mol % $CH_4$, or from about 1.5 mol % to about 6.0 mol % $CH_4$, or from about 1.5 mol % to about 5 mol % $CH_4$, or from about 1.5 mol % to about 4.0 mol % $CH_4$, or from about 2.0 mol % to about 10.0 mol % $CH_4$, or from about 2.0 mol % to about 6.0 mol % $CH_4$, or from about 2.0 mol % to about 5 mol % $CH_4$, or from about 2.0 mol % to about 4.0 mol % $CH_4$, based on the total moles of gas in the reformed gaseous mixture, thereby optionally maintaining the average reformer temperature at or above about 450° C., e.g., above about 500° C., above about 550° C., above about 600° C., above about 650° C., from about 450° C. to about 650° C., from about 500° C. to about 650° C., from about 550° C. to about 600° C., from about 450° C. to about 550° C., or from about 475° C. to about 525° C. In one embodiment, the inlet temperature can be about 550° C. and the outlet temperature about 450° C. In certain embodiments, the outlet temperature of the reformer can be at least about 435° C., or at least about 450° C., or at least about 465° C., or at least about 475° C. The inlet temperature can additionally or alternately be about 650° C. or less, or about 600° C. or less, or about 585° C. or less, or about 575° C. or less, or about 560° C. or less, or about 550° C. or less. In additional or alternate embodiments, it can be advantageous to have an inlet temperature for the reformer of at least about 525° C., or at least about 550° C., or at least about 575° C., or at least about 600° C., such as up to about 650° C. Having a sufficiently high inlet temperature can allow sufficient $H_2$ to be present within the reactor prior to initiate the methanation reaction prior to reaching the location within the reactor where the temperature drops below about 500° C. The catalyst composition may optionally be characterized as providing a gaseous mixture having $CH_4$:$H_2$ ratio (mole/mole) from about 0.025 to about 1.0, or from about 0.05 to about 0.75, or from about 0.075 to about 0.75, or from about 0.10 to about 0.75, or from about 0.25 to about 0.75, e.g., wherein the mixture is substantially/essentially free of oxygen-containing gas other than exhaust gas from the engine and hydrocarbon-containing fuel. In some embodiments, the above amounts of $CH_4$ in the reformed gaseous mixture can be provided when the mixture of exhaust gas and hydrocarbon-containing fuel introduced into the reformer includes about 5.0 mol % or less of $CH_4$, or about 4.0 mol % or less, or about 3.0 mol % or less, or about 2.0 mol % or less, or about 1.0 mol % or less. Additionally or alternatively, the above amounts of $CH_4$ in the reformed gaseous mixture can be provided when the hydrocarbon-containing fuel introduced into the reformer includes about 5.0 mol % or less of $CH_4$, or about 4.0 mol % or less, or about 3.0 mol % or less, or about 2.0 mol % or less, or about 1.0 mol % or less.

One option for maintaining and/or increasing the temperature of a reforming reactor can be to use pre-combustion of a portion of the fuel as a source of heat for the reforming reactor. Pre-combustion can allow the inlet temperature for the reforming reactor to be varied without having to vary some other temperature within the engine. Conventionally, pre-combustion of fuel to provide heat for a reformer in an engine is not preferred, as any fuel burned to heat the reformer represents fuel that cannot be used to drive the powertrain. However, due to the thermodynamic limitation and potential kinetic limitations on the reforming reactions, using pre-combustion can allow increasing the amount of conversion before the thermodynamically limited or kinetically limited temperature is reached. For example, pre-combustion can allow the inlet temperature of the reformer to be increased to a temperature of about 525° C. to about 650° C., or about 525° C. to about 625° C., or about 525° C. to about 600° C., or about 550° C. to about 650° C., or about 550° C. to about 625° C., or about 550° C. to about 600° C. The resulting increase in enthalpy of the product mix due to the reforming reaction can raise the heat of combustion, which can essentially offset the loss in efficiency due to the pre-combustion. This can be desirable up to a point where raising the feed temperature by pre-combustion would lead to significant heat losses to the surrounding; e.g., a temperature over about 650° C.

In some aspects, the invention can include a reformer for use in an exhaust gas recycle portion of an internal combustion engine powertrain, said reformer comprising at least one catalyst composition described herein. Such a reformer may be used in a method of operating an internal combustion engine. This may be accomplished, e.g., by providing an exhaust gas-containing mixture to an exhaust gas recycle reformer. The exhaust gas-containing mixture can typically comprise engine exhaust gas and a first hydrocarbon-containing fuel. At least a portion of the exhaust gas-containing mixture can be passed to the reformer and converted by the catalyst composition in the presence of heat to a reformed gaseous mixture (product) having an increased content of $H_2$ relative to the mixture of exhaust gas and first hydrocarbon-containing fuel. The reformed gaseous mixture and a second hydrocarbon-containing fuel may be provided to the engine for combustion. Typically, the second hydrocarbon-containing fuel can be the same as the first hydrocarbon-containing fuel (i.e., it can be convenient to draw both the first and second hydrocarbon-containing fuels from a common source or tank, in some embodiments), although this need not always be the case. Where desired, the second hydrocarbon-containing fuel may be different from the first hydrocarbon-containing fuel. The reformed gaseous mixture and second hydrocarbon-containing fuel can then be combusted in the engine to form an exhaust gas. A portion of the exhaust gas leaving the engine can be passed through a first heat exchanger to extract heat therefrom. The extracted heat can be transferred, for example, to the feed containing the mixture of fuel and exhaust gas prior to passing the mixture into the reformer, to aid in sustaining the reforming reactions therein.

An important direction in future gasoline engines is use of exhaust gas recycle (EGR). In some embodiments, use of recycled exhaust gas as part of the input fuel mixture to the engine can lower the temperature for combustion. This can allow the engine to run at a higher compression ratio without causing knocking, which can provide increased efficiency. However, the compression ratio and amount of exhaust gas recycle are limited conventionally by practical concerns. Increasing the amount of exhaust gas recycle in a conventional engine can cause the fuel delivered to the engine to become too dilute, leading to problems with the fuel flame speed. Additionally, the compression ratio can be limited by the fuel octane rating, or resistance of a fuel to combustion prior to spark ignition.

In various embodiments, use of exhaust gas recycle with reforming of fuel prior to combustion can allow for increased use of the exhaust gas recycle. For example, use of EGR can provide a media with $H_2O$ and $CO_2$ as reactants for reforming of gasoline to produce $H_2$ rich gas to raise flame speed and/or methane to raise the octane. Typical ranges for EGR that can be used for the engine in conjunction with reforming include about 20 vol % to about 50 vol % of the engine air/EGR mix. For example, the amount of EGR can be at least about 20 vol % of the combined air and exhaust gas delivered to the engine, or at least about 25 vol %, or at least about 30 vol %, or at least about 35 vol %, and/or about 50 vol % or less, or about 45 vol % or less, or about 40 vol % or less, or about 35 vol % or less. It is noted that each of the lower limits and upper limits for the amount of exhaust gas recycle are explicitly contemplated in combination with each other. All or a portion of this EGR can be fed in conjunction with the fuel from tankage to the reformer. The desired amount of EGR relative to feed to the reformer can depend on fuel input, engine design and engine load points. A high level of EGR increases the amount of $H_2O$ and $CO_2$ available for reforming, which can potentially mitigate the extent of temperature drop in the reformer. Alternatively, lowering EGR can raise the fuel concentration and thereby can enhance the kinetics for conversion.

In some embodiments, the reforming reaction can be performed in the presence of a reduced or minimized amount of water. During conventional reforming, the ratio of the amount of water in the reaction environment to the number of carbon atoms in the feed for reforming can be at least about 3 to 1. It has been determined that, by performing the reforming in the presence of a suitable catalyst, the ratio of water to carbon atoms in the feed can be from about 0.30 to 1.0 to about 1.0 to 1.0, or about 0.50 to 1.0 to about 1.0 to 1.0, or about 0.30 to 1.0 to about 0.90 to 1.0. Operating the reforming with a reduced amount of water can be beneficial, as this amount of water can be provided by an exhaust gas recycle stream.

Thus, embodiments of the invention can include a reformer for use in an exhaust gas recycle portion of an internal combustion engine powertrain, said reformer comprising at least one catalyst composition described herein. The catalyst composition can be specifically configured to convert a mixture comprising an internal combustion engine exhaust gas and a hydrocarbon-containing fuel to a gaseous mixture comprising $H_2$, $CO_2$, CO, $H_2O$, $N_2$, and greater than about 1.0 mol % $CH_4$, based on the total moles of gas in the gaseous mixture. It is noted that the output from the reformer may often contain a variety of additional components. For example, in aspects where the input flow to the reformer contains aromatic compounds and/or longer chain aliphatic compounds, the reformer output can typically include one or more types of aromatic compounds. This can include benzene formed by dealkylation of alkylated aromatics; aromatic compounds formed by dehydrocyclization of aliphatic compounds; or other types of aromatics, optionally including substituted aromatics. More generally, the output flow from the reformer can include a mixture of various aliphatic, cyclic, and/or aromatic compounds, optionally including compounds containing heteroatoms other than C and H.

Such a reformer may be used in a method of operating an internal combustion engine. The methane produced in the reformer may be used for using methane-assisted combustion in the engine. This may be accomplished, e.g., by providing an exhaust gas-containing mixture to an exhaust gas recycle reformer. The exhaust gas-containing mixture can typically comprise engine exhaust gas and a first hydrocarbon-containing fuel. At least a portion of the exhaust gas-containing mixture can be passed to the reformer and converted by the catalyst composition in the presence of heat to a reformed gaseous mixture (product) comprising $CH_4$, $H_2$, $CO_2$, CO, $H_2O$, and $N_2$, said $CH_4$ being present at a concentration greater than about 1.0 mol %, based on the total moles of gas in the reformed gaseous mixture. The reformed gaseous mixture and a second hydrocarbon-containing fuel may be provided to the engine for combustion. Typically, the second hydrocarbon-containing fuel can be the same as the first hydrocarbon-containing fuel (i.e., it can be convenient to draw both the first and second hydrocarbon-containing fuels from a common source or tank, in some embodiments), although this need not always be the case. Where desired, the second hydrocarbon-containing fuel may be different from the first hydrocarbon-containing fuel. The reformed gaseous mixture and second hydrocarbon-containing fuel can then be combusted in the engine to form an exhaust gas. The exhaust gas from the engine can be passed through a first heat exchanger to extract heat therefrom. The heat can be transferred, for example, to the input feed (mixture of fuel and exhaust gas) passed into reformer to aid in sustaining the reforming and methane-forming reactions therein.

The use of the catalyst compositions herein can serve to provide an increase in the octane rating of an internal combustion engine exhaust gas stream. An exhaust gas-containing mixture may be provided to an exhaust gas recycle reformer including a catalyst as described herein. The exhaust gas-containing mixture can typically comprise engine exhaust gas and a first hydrocarbon-containing fuel. The first hydrocarbon-containing fuel can typically have a relatively low initial octane rating, e.g., <100 RON, <99 RON, <97 RON, <95 RON, <93 RON, <90 RON, <85 RON, <80 RON, from about 65 RON to about 100 RON, from about 65 RON to about 99 RON, from about 65 RON to about 97 RON, from about 65 RON to about 95 RON, from about 65 RON to about 93 RON, from about 65 RON to about 90 RON, from about 65 RON to about 85 RON, from about 65 RON to about 80 RON, from about 70 RON to about 100 RON, from about 70 RON to about 99 RON, from about 70 RON to about 97 RON, from about 70 RON to about 95 RON, from about 70 RON to about 93 RON, from about 70 RON to about 90 RON, from about 70 RON to about 85 RON, from about 70 RON to about 80 RON, from about 75 RON to about 100 RON, from about 75 RON to about 99 RON, from about 75 RON to about 97 RON, from about 75 RON to about 95 RON, from about 75 RON to about 93 RON, from about 75 RON to about 90 RON, from about 75 RON to about 85 RON, from about 75 RON to about 80 RON, from about 80 RON to about 100 RON, from about 80 RON to about 99 RON, from about 80 RON to about 97 RON, from about 80 RON to about 95 RON, from about 80 RON to about 93 RON, from about 80 RON to about 90 RON, from about 80 RON to about 85 RON, from about 85 RON to about 100 RON, from about 85 RON to about 99 RON, from about 85 RON to about 97 RON, from about 85 RON to about 95 RON, from about 85 RON to about 93 RON, or from about 85 RON to about 90 RON. The catalyst composition in the reformer converts at least a portion of the exhaust gas-containing mixture to a reformed gaseous mixture having a second octane rating (RON) higher than the initial octane rating of the first hydrocarbon-containing fuel. Typically, the reformed gaseous mixture can comprise at least $H_2$, $CO_2$, and greater than about 0.25 mol % $CH_4$, or greater than about 0.4 mol % $CH_4$, or greater than about 1.0 mol % $CH_4$, or greater than about 1.5 mol % $CH_4$, or greater than about 2.0 mol % $CH_4$, and up to about 5.0 mol % $CH_4$, based on the total moles of gas in the reformed gaseous mixture (and typically also CO, $H_2O$, and $N_2$), and this total mixture can advantageously have a second octane rating of >100, e.g., from about 100 to about 125. The lower limit on the range of second octane rating may be about, e.g., 100, 102, 105, 107, 110, 112, 115, 120, or 122. The upper limit on the range of the second octane rating may be about, e.g., 102, 105, 107, 110, 112, 115, 120, 122, or 125. Any combination of lower and upper limits may be provided by such a method, e.g., from about 105 to about 125, from about 110 to about 125, from about 115 to about 125, or from about 120 to about 125.

The reformer may also be incorporated into an internal combustion engine powertrain. Many different variations of such powertrains are known. One such powertrain envisioned can include an internal combustion engine having an exhaust manifold and a fuel intake manifold. A reformer comprising a catalyst composition as described herein can fluidly connect a branch of the exhaust manifold and the fuel intake manifold. The reformer and catalyst composition can be specifically configured to convert an exhaust gas-containing mixture from the exhaust manifold gas and a first hydrocarbon-containing fuel to a reformed gaseous mixture comprising $H_2$, CO, and $CH_4$, along with one or more exhaust gas constituents—typically including $N_2$, $H_2O$, $CO_2$, trace quantities of minor species such as $NO_x$ and $SO_x$, and the like. The reformed gaseous mixture may be characterized by one or more of the following: (i) a Research Octane Number (RON) of >100, e.g., from about 100 to about 130, or more typically from about 100 to about 125 (the lower limit on the range of second octane rating may be about 100, about 102, about 105, about 107, about 110, about 112, about 115, about 120, or about 122; additionally or alternatively, the upper limit on the range of the second octane rating may be about 102, about 105, about 107, about 110, about 112, about 115, about 120, about 122, or about 125; if a range is desired, the range can be, e.g., from about 105 to about 125, from about 110 to about 125, from about 115 to about 125, or from about 120 to about 125); (ii) a $CH_4$ content of greater than about 1.0 mol % (e.g., from about 1.0 mol % to about 6.0 mol % $CH_4$, from about 1.5 mol % to about 5.0 mol % $CH_4$, or from about 2.0 mol % to about 4.0 mol % $CH_4$, based on the number of moles of gas in the reformed fuel mixture); and (iii) a mixture of $H_2$, CO, $CO_2$, $H_2O$, and $CH_4$ (optionally also $N_2$) characteristic of at least about 50% (e.g., at least about 80%, at least about 85%, at least about 90%, or at least about 95%) conversion in the reforming zone. Conversion of a hydrocarbon feed should be understood to be calculated solely by the ratio of the difference between the mass (or number of moles) of hydrocarbon component of the feed entering the inlet of the reforming zone and the mass (or number of moles) of hydrocarbon component exiting the outlet of the reforming zone, divided by the mass (or number of moles) of hydrocarbon component of the feed entering the inlet of the reforming zone. Typically, the intake manifold can be configured to provide a reformed fuel mixture from the exhaust gas recycle unit and a second hydrocarbon-containing fuel to the internal combustion engine for combustion. As described above, the first and second hydrocarbon-containing fuels may be the same or different.

Referring now to FIG. 1, there is shown a schematic representation of an embodiment of such a powertrain. In FIG. 1, air can be drawn into the powertrain by a compressor (1). The power for compressor (1) can come from a turbine (2) that can expand the exhaust gases (3) from the engine exhaust manifold. The compressed air from the compressor can then be cooled in a cooler (4). The air flow rate can be controlled by a throttle valve (5). The air can then be mixed with the EGR stream (9) and delivered to the engine intake manifold (6). A portion of the exhaust gas (3) from the engine can be sent to an EGR stream where converter (7) and cooler means (8) can treat the EGR portion of the engine exhaust prior to reinjection to the engine, while the remaining exhaust gas can be expanded in turbine (2) and vented to the atmosphere at (10).

Hydrocarbon-containing fuel can be supplied to the powertrain in FIG. 1 by injection means (11) into the EGR stream. The EGR stream can comprise substantially components from the exhaust of the engine, which may represent a portion or substantially all the exhaust from the engine. This EGR stream can typically comprise $N_2$, water vapor ($H_2O$), $CO_2$, un-combusted hydrocarbons, and small amounts of CO and $O_2$. The hydrocarbon-containing fuel can be a conventional fuel, such as gasoline, and may optionally be the primary fuel supplied to the engine by direct injection into the engine. However, other fuels can be used instead of or in combination with the conventional fuel (gasoline). Other such fuels can include, but are not necessarily limited to, LPG (liquefied petroleum gas), light ends, $C_2$-$C_{12}$ paraffins, naphtha, kerosene, diesel, FCC off-gas, oxygenated hydrocarbons (e.g., dialkyl ethers such as dimethyl ether, diethyl ether, methyl ethyl ether, and the like, and combinations thereof; $C_1$-$C_{12}$ alcohols such as methanol, ethanol, 1-propanol, isopropanol, 1-butanol, 2-butanol, isobutanol, a pentanol, a hexanol, and the like, and combinations thereof; fatty acid alkyl esters, for instance from mono-, di-, and/or tri-glyceride reaction with a $C_1$-$C_4$ alcohol, such as represented by FAME, FAEE, and the like, and combinations thereof; and the like; and combinations thereof), hydrocarbon-rich gas overhead from a refinery process, hydrocarbon-rich off-gas from a chemical process, or the like, or combinations thereof.

Whatever fuel is used as a feed in the methods described herein, it can advantageously have one, two, or all of the following characteristics: a relatively high paraffin content, no more than a modest aromatics content, and a relatively small content of polynuclear aromatics (PNAs, meaning compounds having two or more aromatic rings in its structure, typically two or more aromatic rings connected to each other, e.g., sharing two carbon atoms between them). The overall aromatics content of the hydrocarbon-containing fuel to be fed into the reforming zone can advantageously be no more than about 35 wt % (e.g., no more than about 30 wt %, no more than about 25 wt %, no more than about 20 wt %, no more than about 15 wt %, or no more than about 10 wt %), based on the weight of the hydrocarbon-containing fuel (optionally, the fuel can additionally have some aromatics content, e.g., at least about 0.1 wt %, at least about 0.5 wt %, at least about 1 wt %, at least about 2 wt %, at least about 3 wt %, at least about 4 wt %, at least about 5 wt %, at least about 7 wt %, at least about 10 wt %, or at least about 15 wt %, based on the weight of the hydrocarbon-containing fuel). Additionally or alternately, the PNA content of the hydrocarbon-containing fuel to be fed into the reforming zone can advantageously be no more than about 3 wt % (e.g., no more than about 2 wt %, no more than about 1 wt %, no more than about 0.5 wt %, or no more than about 0.1 wt %), based on the weight of the hydrocarbon-containing fuel (though PNAs can typically be undesirable for relatively high conversion in reforming, the fuel may nonetheless optionally have some PNA content, e.g., at least about 0.001 wt %, at least about 0.005 wt %, at least about 0.01 wt %, at least about 0.03 wt %, at least about 0.05 wt %, at least about 0.07 wt %, at least about 0.1 wt %, at least about 0.2 wt %, at least about 0.3 wt %, or at least about 0.5 wt %, based on the weight of the hydrocarbon-containing fuel). Further additionally or alternatively, the paraffin content of the hydrocarbon-containing fuel to be fed into the reforming zone can advantageously be greater than about 50 wt % (e.g., at least about 55 wt %, at least about 60 wt %, at least about 65 wt %, at least about 70 wt %, at least about 75 wt %, at least about 80 wt %, at least about 85 wt %, at least about 90 wt %, at least about 95 wt %, at least about 96 wt %, at least about 97 wt %, at least about 98 wt %, or at least about 99 wt %), based on the weight of the hydrocarbon-containing fuel (though paraffinic hydrocarbons can typically be very desirable for relatively high conversion in reforming, the fuel may nonetheless optionally have some upper limit on paraffin content, e.g., up to about 99.9 wt %, up to about 99.5 wt %, up to about 99 wt %, up to about 98 wt %, up to about 97 wt %, up to about 96 wt %, up to about 95 wt %, up to about 90 wt %, up to about 85 wt %, up to about 80 wt %, up to about 75 wt %, up to about 70 wt %, up to about 65 wt %, or up to about 60 wt %, based on the weight of the hydrocarbon-containing fuel).

Figure 2:
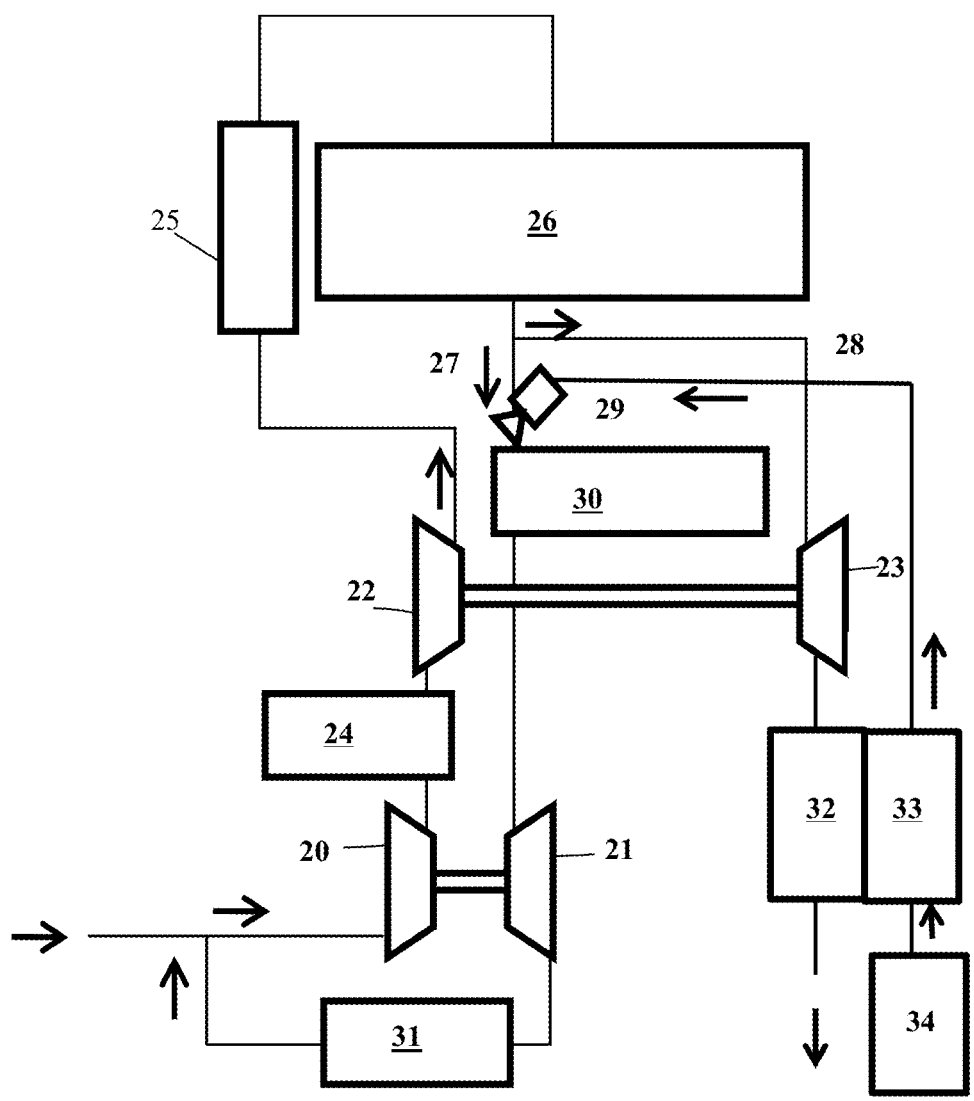
FIG. 2 shows a schematic representation of another embodiment of the powertrain.

In FIG. 2, the fuel can be pre-heated and vaporized before its injection into the EGR stream using waste heat in the engine exhaust stream. The fuel and exhaust gas in the EGR stream can be reacted in a reformer including a catalyst composition according to embodiments of the invention to form syngas ($CO/CO_2$ and $H_2$) and methane ($CH_4$). Optionally, the reformer may also be heated by combusting a hydrocarbon-containing fuel during cold starts. The EGR stream leaving the reformer, i.e., the reformed fuel stream, can optionally be cooled by passing it though a heat exchanger. The reformed fuel stream may, upon cooling, be supplied to the engine cylinders or co-mingled with a primary fuel delivered to the engine by direct injection.

In one embodiment, the generation of hydrogen in the powertrain of FIG. 1 can be accomplished by an initial endothermic reaction to produce syngas. The syngas-containing hydrogen can then be used to conduct the methane-producing exothermic reaction described above, to thereafter sustain the temperature high enough for the endothermic reforming processes of reactor during operation. Alternatively, start-up hydrogen for the methane formation reaction may be supplied by stored hydrogen (not shown), which optionally may be replenished after start-up by operation of the reforming reaction.

Referring now to FIG. 2, there is shown a schematic representation of another embodiment of a powertrain having a reformer of the present invention in the EGR loop. A feature of this second embodiment is that two turbine-compressor systems are used. In FIG. 2, air and exhaust gas from the EGR stream can be mixed and compressed by compressor (20). The power for compressor (20) can come from a turbine (21) that can expand the EGR stream. The compressed mixture from (20) can be cooled in a cooler (24) and compressed by a second compressor (22). The power for compressor (22) can come from a turbine (23) that can expand the exhaust gas vented to the atmosphere. The compressed air and EGR gas can be cooled at (25) and then delivered to the engine (26). A portion of the exhaust gas from the engine can be sent to an EGR stream (27), while the remaining exhaust gas (28) can be expanded in turbine (23), led over a three-way catalyst in a catalytic converter (32) and vented to the atmosphere. Fuel can be provided from a fuel tank (34), injected into the EGR stream (29), and the stream can then be passed to reformer (30), substantially identical to that described in the embodiment of the invention depicted in FIG. 1. The stream exiting the reformer can be expanded in turbine (21), cooled in a cooler (31), and finally mixed with the air stream supplying the powertrain. Optionally, fuel may be preheated and/or vaporized prior to injection into the EGR stream, e.g., by means of a heat exchanger (33). Heat can be derived from the net exhaust by first raising the exhaust temperature by combustion of residual hydrocarbons and CO over a three-way catalyst. The heat transfer from the three-way catalyst to the hydrocarbon feed is merely one potential mechanism for heat integration. There are other ways of attain heat integration than described in FIG. 2 that derive heat from the net engine exhaust gas, and any one or more of them may be used in tandem with the invention, in addition or alternatively to the configuration shown in FIG. 2.

A configuration such as the configuration shown in FIG. 2 can provide a variety of advantages. For example, a configuration with a plurality of turbine-compressor systems can provide advantages for reducing or minimizing loss in fuel efficiency that might be caused by the reforming and exhaust gas recycle components. In such an example, a reformer can be included as part of the engine power train. The reformer can receive a mixture of hydrocarbon-containing fuel and recycled exhaust gas. The mixture of fuel and recycled exhaust gas can be reformed or otherwise converted to produce a reformed gaseous mixture. This reformed gaseous mixture can then be prepared for combustion in the engine using a plurality of turbine-compressors. For example, a first turbine-compressor system can be powered by expanding at least a portion of the reformed gaseous mixture produced by the reformer. The reformed gaseous mixture can then be combined with air (or another source of oxygen) and then compressed by the first turbine-compressor system. A second turbine-compressor system can then provide further compression for the combined stream containing the reformed gaseous mixture and air. The second turbine-compressor system can be powered by expanding a portion of the exhaust gas flow that is not recycled to the engine. After the second compression, the combined stream containing the reformed gaseous mixture and air can be introduced into the engine for combustion.

It is noted that the compression of the combined stream of air and the reformed gaseous mixture can lead to temperature increases for the combined stream. In order to maintain a desirable temperature for combined stream prior to entering the engine and/or in order to improve engine efficiency, heat exchangers can be used to cool the combined stream of air and the reformed gaseous mixture after one or more of the compressions. For example, in the example described above a first heat exchanger can be used to cool the compressed output stream from the first turbine-compressor system, while a second heat exchanger can be used to cool the output stream from the second turbine-compressor system. The first and/or the second heat exchanger can then be used to provide heat for any other convenient stream in the engine environment. Of course, other combinations of turbine-compressor systems and/or heat exchangers can also be used.

Dedicated Cylinder Fuel Cracking (Thermal Cracking)

An option for reducing the heat required for reforming of a hydrocarbon-containing fuel can be to expose at least a portion of the fuel to thermal cracking conditions prior to reforming. An example of a method for performing thermal cracking can be to use one or more cylinders (abbreviated herein as "a cylinder") in the engine as the vessel for performing the thermal cracking.

During a combustion cycle in a cylinder of an internal combustion engine, the injection of fuel for combustion into the cylinder can be performed at a specific time in order to achieve a desired performance for the engine. The timing of injecting the fuel for combustion can be specified relative to the location of the piston in the cylinder. A convenient way of specifying the location of the piston can be to use a crank angle, which can specify the position of the crankshaft relative to the piston. A crank angle of 0° is defined as the location when the piston is top dead center of the compression stroke. Crank angle values less than 0° relative to top dead center can refer to piston positions during the compression stroke, while crank angle values greater than 0° can refer to piston positions after top dead center during expansion. Combustion of idealized fuel could occur at a crank angle of about 0°. In practice, the fuel in a cylinder combusts over a finite period of time, so that at least a portion of the combustion reaction can typically occur after 0° relative to top dead center.

After combustion is completed during the expansion stroke, the conditions within an engine cylinder can be suitable for performing thermal cracking on a hydrocarbon-containing fuel. The temperatures inside a cylinder can be substantially greater than 400° C. during expansion for at least a portion of the expansion stroke. As a result, if additional fuel is injected into the cylinder during expansion but after completion of combustion, the additional fuel can be thermally cracked. The exhaust from the cylinder can then be used as at least a portion of the fuel for operating the engine. In various embodiments, the exhaust from the cylinder can be passed through a catalytic reformer prior to using the cylinder exhaust as a fuel for the engine.

Figure 13:
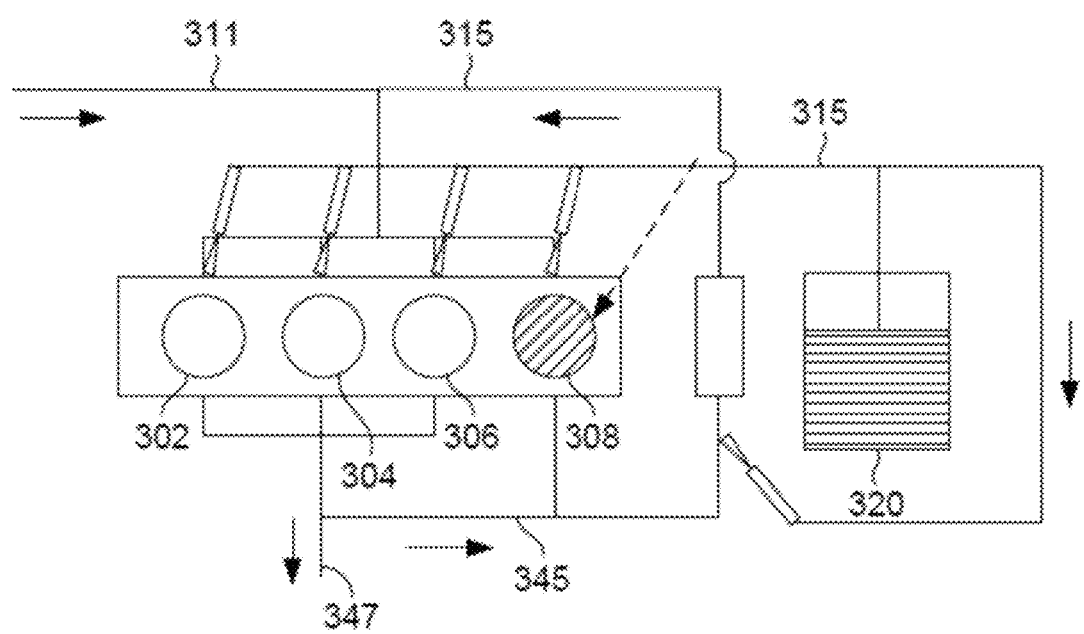
FIG. 13 shows a schematic representation of an engine configured for performing thermal cracking in a cylinder.

FIG. 13 schematically shows an example of an engine configuration for using the expansion stroke of an engine cylinder as a thermal cracking environment for a hydrocarbon-containing fuel. In FIG. 13, an example of a 4 cylinder engine is shown, although any convenient number of cylinders could be used. Similarly, in FIG. 13 one cylinder is shown as being used to provide the thermal cracking environment, but a plurality of cylinders can also be used to provide the thermal cracking environment.

In FIG. 13, an engine 300 can include a plurality of cylinders. Cylinders 302, 304, and 306 can correspond to conventional cylinders, while cylinder 308 can be adapted for use in providing a thermal cracking environment during the expansion stroke. In the example shown in FIG. 13, two separate manifolds can be available for delivering fuel for combustion to the cylinders 302, 304, 306, and 308. A first manifold 315 can allow fuel to be delivered from tank 320. The fuel in tank 320 can correspond to any convenient naphtha boiling range fuel, such as a 85-93 RON fuel that may be available from a typical commercial filling station, or any other convenient type of naphtha boiling range fuel suitable for operating an internal combustion engine. A second manifold 325 can allow fuel to be delivered from catalytic reformer 330. Catalytic reformer 330 can receive fuel from tank 320 and/or from cylinder 308. In FIG. 13, a separate flow path 335 can provide fuel for thermal cracking from manifold 315 to cylinder 308. Alternatively, the same fuel path used for delivering fuel for combustion to cylinder 308 can be used with appropriate control apparatus. Air 311 can also be delivered to the cylinders when fuel is delivered using either manifold. In the example shown in FIG. 13, all of the exhaust from cylinder 308 can be recycled to catalytic reformer 330. Optionally, as shown in FIG. 13, a portion of the exhaust 345 from other cylinders 302, 304, and/or 306 can also be passed into catalytic reformer 330 as part of an exhaust gas recycle loop. Exhaust 347 that is not recycled as part of the exhaust gas recycle loop can be passed into a typical exhaust system for the engine.

Additional Embodiments

Embodiment 1

A method of operating an internal combustion engine using methane-assisted combustion, comprising: (a) providing an exhaust gas-containing mixture to an exhaust gas recycle reformer, the exhaust gas-containing mixture comprising a mixture comprising recycled exhaust gas and a first hydrocarbon-containing fuel; (b) converting at least a portion of the exhaust gas-containing mixture in the presence of heat and a catalyst composition to a reformed gaseous mixture comprising $CH_4$, CO, $CO_2$, $H_2O$, $N_2$, and $H_2$, said $CH_4$ being present at a concentration greater than 1.0 mol % $CH_4$, based on the total moles of gas in the reformed gaseous mixture; (c) introducing at least a portion of the reformed gaseous mixture and a second hydrocarbon-containing fuel into the engine, wherein said second hydrocarbon-containing fuel may be the same or different from the first hydrocarbon-containing fuel; (d) combusting the at least a portion of the reformed gaseous mixture and second hydrocarbon-containing fuel in the engine to form an exhaust gas, the exhaust gas comprising a first portion of the exhaust gas and a second portion of the exhaust gas; and (e) passing a first portion of the exhaust gas through a first heat exchanger to extract heat from the first portion of the exhaust gas, the recycled exhaust gas comprising the second portion of the exhaust gas.

Embodiment 2

A method of increasing the octane rating of an internal combustion engine exhaust gas stream, said method comprising: (a) providing an exhaust gas-containing mixture to an exhaust gas recycle reformer, the exhaust gas-containing mixture comprising recycled exhaust gas and a first hydrocarbon-containing fuel, said exhaust gas-containing mixture containing about 3.0 mol % of $CH_4$ or less and having an initial octane rating, and (b) converting under reforming conditions, optionally in the presence of heat and a catalyst composition, at least a portion of the exhaust gas-containing mixture to a reformed gaseous mixture having a second octane rating (RON) from 100 to 125, the reformed gaseous mixture comprising $H_2$, CO, $CO_2$, $H_2O$, $N_2$, and greater than 1.0 mol % $CH_4$ based on the total moles of gas in the reformed gaseous mixture.

Embodiment 3

A reformer for use in an exhaust gas recycle portion of an internal combustion engine powertrain, the reformer comprising a catalyst composition specifically configured to convert a mixture comprising a recycled (internal combustion engine) exhaust gas and a hydrocarbon-containing fuel to a reformed gaseous mixture comprising $H_2$, CO, $CO_2$, $H_2O$, $N_2$, and greater than 1.0 mol % $CH_4$ based on the total moles of gas in the gaseous mixture.

Embodiment 4

An internal combustion engine powertrain, comprising: (a) internal combustion engine having an exhaust manifold and a fuel intake manifold; and (b) an exhaust gas recycle reformer fluidly connecting the exhaust manifold and the fuel intake manifold; said reformer comprising a catalyst composition to convert an exhaust gas-containing mixture including recycled exhaust gas from the exhaust manifold and a first hydrocarbon-containing fuel to a reformed gaseous mixture comprising $H_2$, CO, $CO_2$, $H_2O$, $N_2$, and $CH_4$ and having one or more of the following: (i) a Research Octane Number (RON) from 100 to 125; (ii) a $CH_4$ content of greater than about 1.0 mol % based on the number of moles of gas in the reformed fuel mixture; and (iii) a mixture of $H_2$, CO, $CO_2$, $H_2O$, and $CH_4$ characteristic of at least about 50% conversion of the combination of the exhaust gas-containing mixture and the first hydrocarbon-containing fuel in the reforming zone; the fuel intake manifold configured to provide a reformed fuel mixture from the exhaust gas recycle unit and a second hydrocarbon-containing fuel to the internal combustion engine for combustion, wherein the first and second hydrocarbon-containing fuels may be the same or different.

Embodiment 5

The method, reformer, or internal combustion engine powertrain of any of the above embodiments, wherein the first hydrocarbon-containing fuel comprises about 5.0 mol % or less of $CH_4$, or about 3.0 mol % or less, or about 2.0 mol % or less, or about 1.0 mol % or less.

Embodiment 6

The method, reformer, or internal combustion engine powertrain of any of the above embodiments, further including prior to introducing the reformed gaseous mixture into the internal combustion engine, cooling the gaseous mixture by passing the gaseous mixture through the first heat exchanger or a second heat exchanger.

Embodiment 7

The method, reformer, or internal combustion engine powertrain of any of the above embodiments, wherein providing the exhaust gas-containing mixture to the reformer does not substantially include providing an oxygen-containing gas other than engine exhaust gas and a first hydrocarbon-containing fuel.

Embodiment 8

The method, reformer, or internal combustion engine powertrain of any of the above embodiments, wherein the catalyst composition comprises a hydrocarbon-reforming catalyst, the catalyst composition having a hydrocarbon-reforming catalyst loading from 1.0 wt % to 10.0 wt %, based on the total weight of the catalyst composition, a metal of the hydrocarbon reforming catalyst optionally being selected from the group consisting of Co, Ru, Rh, Pt, Pd, Ni, Ir, Zn, Re, and mixtures thereof.

Embodiment 9

The method, reformer, or internal combustion engine powertrain of any of the above embodiments, wherein the catalyst composition further comprises a metal oxide composition, the metal oxide composition comprising and/or being selected from aluminum oxides, silicon oxides, rare-earth metal oxides, Group IV metal oxides, and mixtures thereof, for example a metal oxide composition comprising a mixture of an aluminum-containing oxide and a cerium-containing oxide.

Embodiment 10

The method, reformer, or internal combustion engine powertrain of any of the above embodiments, wherein the catalyst composition further comprises at least one medium pore molecular sieve or large pore molecular sieve, for example the catalyst composition further comprises ZSM-5, phosphorus-modified ZSM-5, MCM-68, or a combination thereof.

Embodiment 11

The method of any of Embodiments 1-2 and 5-10, wherein providing an exhaust gas-containing mixture to an exhaust gas recycle reformer comprises: passing at least a portion of the first hydrocarbon-containing fuel into a cylinder of the engine after the combusting of the reformed gaseous mixture and second hydrocarbon-containing fuel to form a portion of the exhaust gas; cracking the at least a portion of the first hydrocarbon-containing fuel in the cylinder to form a cracked hydrocarbon-containing fuel; and providing the portion of the exhaust gas and the cracked hydrocarbon-containing fuel to the exhaust gas recycle reformer.

Embodiment 12

The method, reformer, or internal combustion engine powertrain of any of the above embodiments, further comprising pre-combusting a portion of exhaust gas-containing mixture prior to providing the exhaust gas-containing mixture to the exhaust gas recycle reformer, the exhaust gas recycle reformer having a reformer inlet temperature of about 525° C. to about 625° C.

Embodiment 13

The method, reformer, or internal combustion engine powertrain of any of the above embodiments, wherein the reformed gaseous mixture comprises from 1.5 mol % to 6.0 mol % $CH_4$, or 2.0 mol % to 5.0 mol %, or the reformed gaseous mixture has a $CH_4$:$H_2$ ratio (mol/mol) from 0.025 to 1.0, or a combination thereof.

Embodiment 14

The method, reformer, or internal combustion engine powertrain of any of the above embodiments, wherein said converting supplies heat sufficient to maintain the reformer at an average reformer temperature above about 450° C.

Embodiment 15

The internal combustion engine powertrain of any of Embodiments 4-10 and 12-14, further comprising a first turbine-compressor system and a second turbine-compressor system, the first turbine-compressor system being powered by expansion of the reformed gaseous mixture, the first turbine-compressor system compressing a combined stream of the reformed gaseous mixture and air to form a first compressed stream, the second turbine-compressor system being powered by expansion of a second portion of exhaust gas from the exhaust gas manifold, the second turbine-compressor system compressing the first compressed stream to form a second compressed stream, wherein the second compressed stream comprises the reformed fuel mixture provided by the fuel intake manifold.

Embodiment 16

The internal combustion engine powertrain of Embodiment 15, further comprising a first heat exchanger and a second heat exchanger, the first compressed stream being cooled by the first heat exchanger prior to the compressing by the second turbine-compressor system, the second compressed stream being cooled by the second heat exchanger prior to being provided by the fuel intake manifold.

EXAMPLES

Example 1

Preparation of Catalyst A:

Catalyst A included ~3.75 wt % Rh and ~1.25 wt % Pt supported on a mixed metal oxide comprising $La_2O_3$-$\gamma$-$Al_2O_3$ (~35 wt % of total) and $CeO_2$—$ZrO_2$ (~60 wt % of total). The $La_2O_3$—$Al_2O_3$ support was prepared separately by impregnation of an aqueous $La(NO_3)_3$ solution onto $\gamma$-$Al_2O_3$ (about 4.5 wt % $La_2O_3$). The impregnated $\gamma$-$Al_2O_3$ was dried and calcined at ~600° C. $CeO_2$—$ZrO_2$ was co-precipitated from an aqueous $Ce(NO_3)_4$ and $Zr(NO_3)_4$ solution onto the $La_2O_3$—$Al_2O_3$ support using urea as base. The Ce:Zr atomic ratio was ~4:1. The La-$\gamma$-$Al_2O_3$—$CeO_2$—$ZrO_2$ support was calcined at ~600° C. prior to incipient wetness impregnation with an aqueous solution containing $Rh(NO_3)_3$ and $Pt(NH_3)_4(NO_3)_2$. After the precious metal impregnation, the catalyst was calcined in air at ~600° C.

Propane Steam Reforming Test of Catalyst A:

For the catalytic test ~0.08 grams of catalyst powder A sized to about 25-40 mesh was diluted with silica at a ratio ~1:15. The diluted catalyst was loaded into a vertically mounted cylindrical quartz plugged flow reactor (~6 mm idx~15 mm long) which is heated by a furnace. The temperature was measured in the front catalyst bed (~¼" from catalyst inlet) and in rear catalyst bed (~¼" from the catalyst outlet). The average catalyst bed temperature was calculated from the catalyst bed temperatures at the inlet and outlet. A feed gas comprising ~13.3 mol % propane, ~27.4 mol % $H_2O$, and ~26.6 mol % $CO_2$ in $N_2$ balance was fed over the catalyst to achieve gas hourly space velocities of ~26 khr$^{-1}$ and ~52 khr$^{-1}$. The conversion of propane and the concentration of the reaction product methane were monitored by FID the concentration of reaction products, and carbon monoxide and hydrogen were detected by GC/TCD analyzers.

Figure 3:
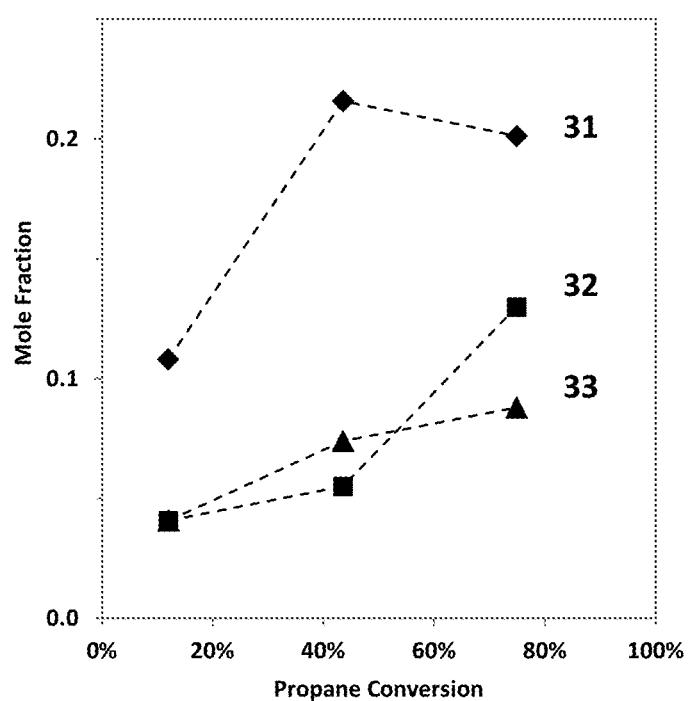
FIG. 3 shows a graph of the amounts of hydrogen, methane, and carbon monoxide produced versus propane conversion for an embodiment of the present invention.

FIG. 3 shows the amounts of $H_2$ (31), $CH_4$ (32), and CO (33) produced by the example reformer at various levels of fuel conversion. The mole fraction of $CH_4$ in the reformer product appeared to increase from about 0.04 at ~12% fuel conversion to about 0.06 at ~44% fuel conversion to about 0.13 at ~75% fuel conversion.

Figure 4:
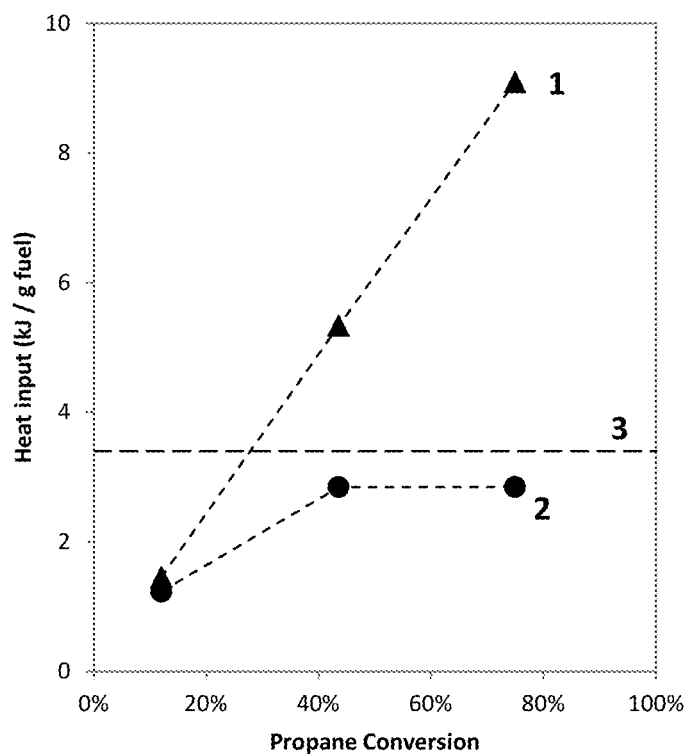
FIG. 4 shows a graph of the amount of heat required to maintain the example reformer at constant temperature.

Referring now to FIG. 4, trace (41) shows the amount of heat needed to maintain the reformer at about constant temperature when the reforming catalyst produced substantially only syngas and no methane. The heat requirement appeared to increase from about 1.5 kJ/g fuel at ~12% fuel conversion to about 5.3 kJ/g fuel at ~44% conversion to about 9.1 kJ/g fuel at ~75% fuel conversion in this case. Trace (42) shows the amount of heat needed to maintain the reformer at constant temperature when the reforming catalyst produces the levels of methane shown in FIG. 3. The heat requirement appeared to be much lower in this case, varying from about 1.2 kJ/g fuel at ~12% fuel conversion to about 2.8 kJ/g fuel at ~44% conversion to about 2.8 kJ/g fuel at ~75% fuel conversion. Trace (43) shows the amount of heat released by cooling the recycled exhaust gas by ~100° C. and by combusting fuel with residual oxygen, present at about a 1% level in the exhaust gas. Trace (43) also shows that this amount of heat appeared to be enough to supply the additional heat needed for the reforming reactions.

Example 2

Preparation of Catalyst B:

Catalyst B consisted of ~3.75 wt % Rh and ~1.25 wt % Pt supported on a mixed metal oxide comprising $La_2O_3$-$\theta$-$Al_2O_3$ (~35 wt % of total) and $CeO_2$—$ZrO_2$ (~60 wt % of total). Catalyst B was prepared in the same way as catalyst A except that $\theta$-$Al_2O_3$ was used as support instead of $\gamma$-$Al_2O_3$.

Figure 5:
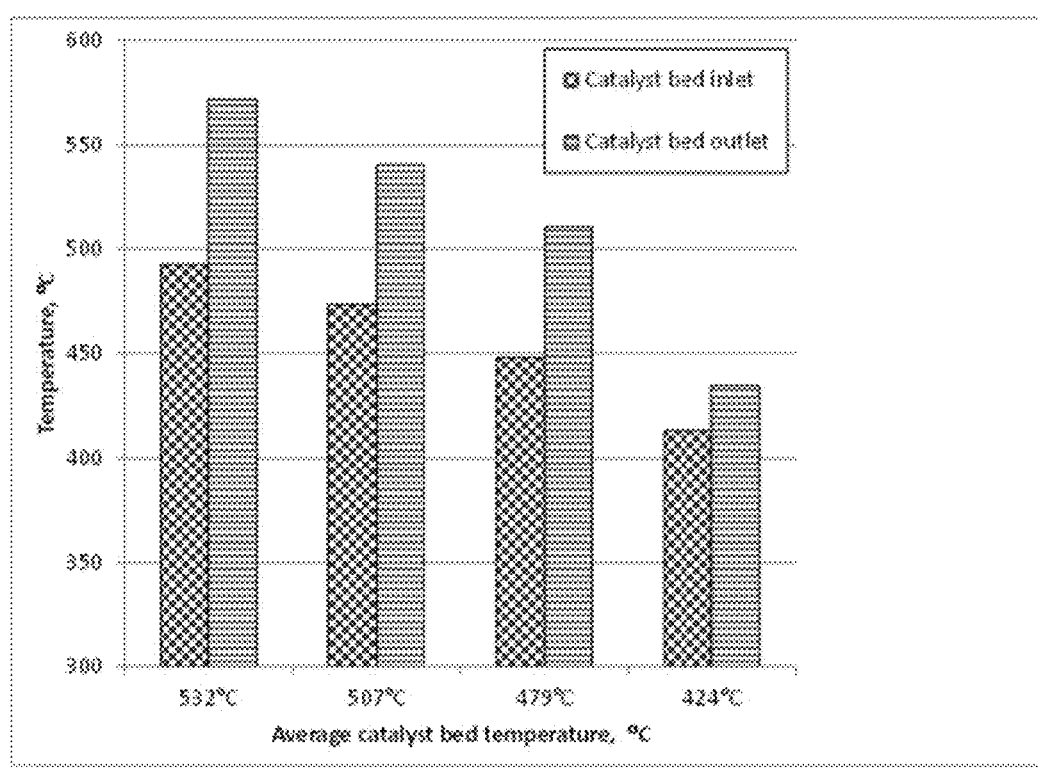
FIG. 5 shows a graph showing the front and rear catalyst bed temperatures for four average catalyst bed temperatures in propane reforming for an embodiment of the present invention.

Propane Steam Reforming Test of Catalyst B:

The same reactor and gas analyzers as described in Example 1 were used for the catalytic testing of catalyst B. Catalyst B was sized to ~40-80 mesh and ~2.38 grams was loaded into the reactor without diluent. A feed gas comprising ~18.2 mol % propane, ~37.9 mol % $H_2O$, ~35.4 mol % $CO_2$, and balance $N_2$, was fed over the catalyst to achieve a gas hourly space velocity of ~12.6 khr$^{-1}$. The temperature of the furnace was varied to achieve average catalyst bed temperatures of ~532° C., ~507° C., ~479° C., and ~424° C., as indicated in FIG. 5. In FIG. 5, the inlet temperature is shown on the left and the outlet temperature is shown on the right for each average catalyst bed temperature. The fuel conversion was ~100% at ~532° C., ~507° C., and ~479° C., and ~22% at ~424° C. average catalyst bed temperature.

Figure 6:
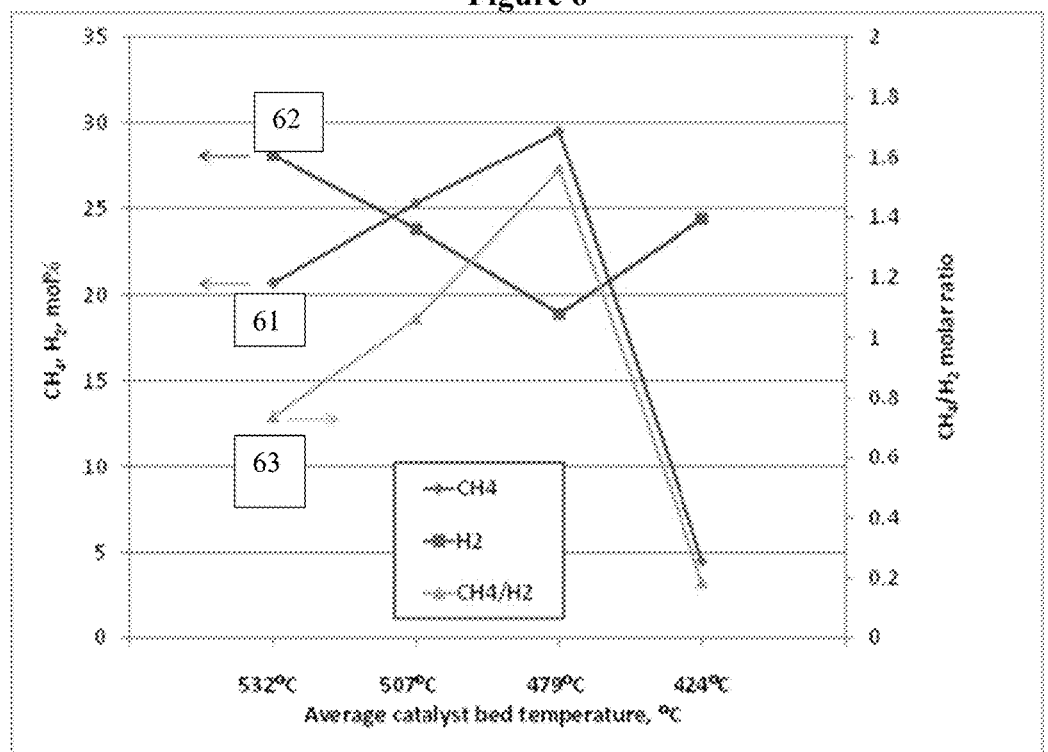
FIG. 6 shows a graph showing the methane and hydrogen mol % and the molar ratios of methane to hydrogen for the experiment described in FIG. 5.

FIG. 6 shows the mol % of methane (61) and hydrogen (62) and the $CH_4/H_2$ molar ratio (63). In the range from about 532° C. to about 479° C. average catalyst bed temperature, the methane concentration appeared to increase while the hydrogen concentration appeared to decrease with decreasing temperature. The methane/hydrogen molar ratio appeared to reach a maximum at about 479° C. and appeared to decrease sharply at ~424° C. average catalyst bed temperature.

The catalyst inlet bed temperature appeared to be consistently lower than the catalyst outlet bed temperature, presumably because of a combined effect of the endothermic steam reforming reaction occurring predominantly in the front of the catalyst and the exothermic methanation reaction occurring predominantly near the rear end of the catalyst.

Example 3

Preparation of Catalyst C:

Catalyst C consisted of ~3.5 wt % Rh supported on a metal oxide comprising $La_2O_3$-$\gamma$-$Al_2O_3$ (~38.5 wt % of total) and $CeO_2$—$ZrO_2$ (~58 wt % of total). Catalyst C was prepared by a similar method as Catalyst A, except the aqueous impregnation solution contained only $Rh(NO_3)_3$.

Preparation of Catalyst D:

Catalyst D consisted of rhodium supported on $\gamma$-alumina A nominal metal loading of ~2.0 wt % rhodium was attained. For the preparation of catalyst D, an aqueous solution containing $Rh(NO_3)_3$ was impregnated onto the $\gamma$-alumina support in one step. The powder was dried after the impregnation for ~12 hours at ~110° C. in air. After drying, the powder catalyst was calcined for ~4 hours at ~450° C. in air.

After the calcination, the catalyst powder was pelletized and reduced for ~4 hours at ~350° C. in a flow of ~10% $H_2$, balance $N_2$, followed by a ~1 hour purge in a flow of pure $N_2$ gas at ~350° C.

Preparation of Catalyst E:

Catalyst E consisted of rhodium supported on silica. About 0.99 grams of an aqueous rhodium nitrate solution (~10 wt % Rh), ~1.35 grams of arginine, and about 6 drops of ~60% nitric acid were added to deionized water, so that the total solution volume reached ~10.0 cm³. The impregnate solution was added onto ~10.0 grams of a silica support (Davisil™ 646) by incipient wetness. The catalyst was dried at ~100° C. overnight (~8-16 hours). The catalyst was calcined in air at ~425° C. for ~4 hours.

Preparation of Catalyst F:

Catalyst F consisted of rhodium and ruthenium supported on γ-alumina. Nominal metal loadings of ~3.5 wt % rhodium and of ~1.71 wt % ruthenium were attained. For the preparation of catalyst F, an aqueous solution containing $Rh(NO_3)_3$ and $Ru(NO)(NO_3)_3$ was impregnated onto the γ-alumina support in two steps. An incipient wetness volume of ~90% was achieved in the first impregnation step and of ~85% in the second impregnation step. Powders were dried between impregnations and after the second impregnation for ~12 hours at ~110° C. in air. After drying, the powder catalyst was calcined for ~4 hours at ~450° C. in air. After calcination, the catalyst powder was pelletized and reduced for ~4 hours at ~350° C. in a flow of ~10% $H_2$, balance $N_2$, followed by a ~1 hour purge in a flow of pure $N_2$ gas at ~350° C.

n-Heptane Steam Reforming Test:

About 50 mg to about 1250 mg of catalysts C, D, E, and F were sized to ~40-60 mesh and blended with quartz sized to ~60-80 mesh to obtain ~4 cm³ of catalyst-quartz mixture. The catalyst diluent mixture was loaded into a stainless steel reactor tube of ~4" length and ~0.3" inner diameter. The reactor tube was heated by a furnace to maintain constant temperatures of ~450° C., ~500° C., or ~550° C. throughout the length of the catalyst bed. A thermocouple in the bed was used to confirm that all experiments were performed approximately isothermally. A gas mixture comprising ~2.5 mol % n-heptane, ~13 mol % $H_2O$, ~11 mol % $CO_2$, and balance $N_2$ was fed to the catalyst at a pressure of ~2 barg (~200 kPag) or ~4 barg (~400 kPag). The total gas flow rate was varied between about 70 mL/min and about 400 mL/min to achieve different levels of fuel conversion.

Figure 7:
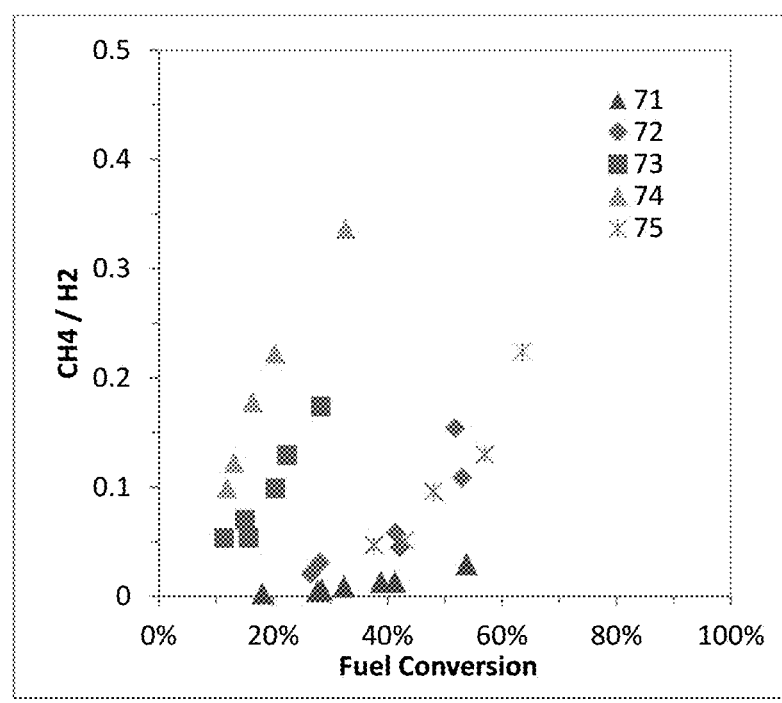
FIG. 7 shows a graph showing ratios of methane to hydrogen versus n-heptane conversion.

The ratio of methane and hydrogen as a function of conversion at ~500° C. catalyst bed temperature was measured for catalyst C (71), D (72), E (73), and F (75) at ~2 barg (~200 kPag) pressure, as well as for catalyst E (74) at ~4 barg (~400 kPag) pressure. It was apparent that catalysts D, E, and F appeared to exhibit a higher $CH_4/H_2$ ratio compared to the reference catalyst C. The $CH_4/H_2$ ratio also appeared to be higher when the pressure was raised from ~2 barg (~200 kPag) to ~4 barg (~400 kPag). These are shown in the graph at FIG. 7.

The catalyst and conditions in trace (74) appeared to be the most effective at maintaining high catalyst temperatures.

Figure 8:
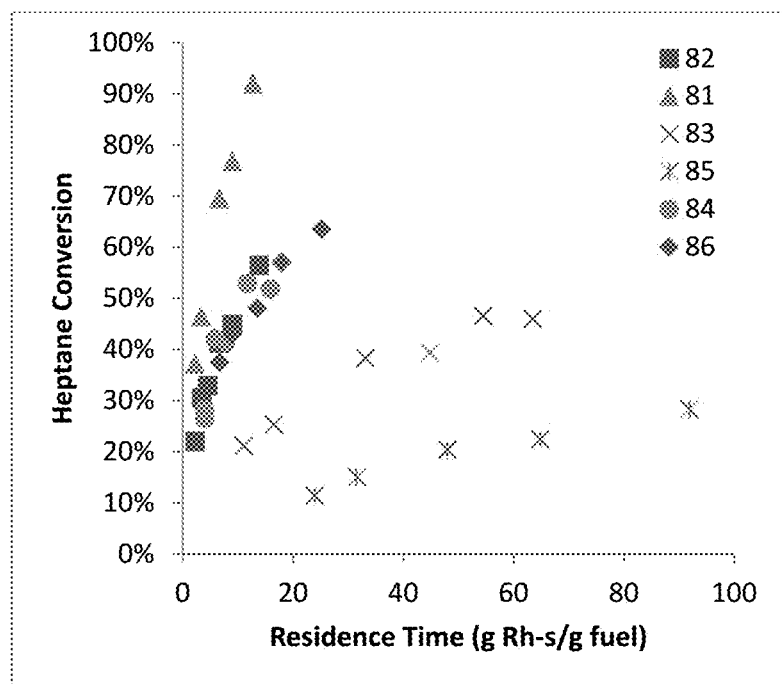
FIG. 8 shows a graph showing heptane conversion versus residence time.

FIG. 8 shows n-heptane conversion versus contact time for (81) Catalyst C at ~550° C., (82) Catalyst C at ~500° C., (83) Catalyst C at ~450° C., (84) Catalyst D at ~500° C., (85) Catalyst E at ~500° C., and (86) Catalyst F at ~500° C. The conditions were ~2.5 mol % n-heptane, ~13 mol % $H_2O$, ~11 mol % $CO_2$, and balance $N_2$, at ~2 barg (~200 kPag) pressure.

Example 4 (RON92)

In this Example, catalyst C from the prior examples was used in the steam reforming reaction of a model hydrocarbon fuel blend comprising ~38 wt % toluene, ~49 wt % iso-octane, and ~13 wt % n-heptane and having a calculated RON of ~92. The same reactor and gas analyzers as described in the prior example were used. Catalyst C was sized to ~25-40 mesh and ~1.42 grams was loaded into the reactor without diluent. A feed gas comprising ~5.3 mol % fuel, ~27.4 mol % $H_2O$, ~26.6 mol % $CO_2$, and balance $N_2$, was fed over the catalyst to achieve a gas hourly space velocity of ~12.6 khr⁻¹. The average hydrocarbon conversion was measured at four temperatures. The temperatures were average catalyst bed temperatures measured at the catalyst inlet and catalyst outlet, as defined in Example 1.

An analysis of the conversion of total hydrocarbons and that of the individual feed hydrocarbons toluene, n-heptane, and iso-octane was conducted at four average catalyst bed temperatures. The reactivity of the feed hydrocarbon appeared to decrease in the order: toluene>n-heptane>iso-octane. It was noted that the catalyst appeared to convert toluene better than n-heptane. The paraffin component n-heptane having a RON of about zero was converted with relatively high efficiency into a high RON gas mixture even at low temperatures. This finding appears to support the capability of on-board fuel reforming of naphtha fuel that is paraffinic in nature.

Example 5

This example was used to illustrate an alternate embodiment where hydrogen is supplied to the reformer. This may be accomplished for example by operating the engine in a manner that one or several cylinders of the engine are operated under rich combustion conditions at lambda <1, so as to generate hydrogen in an isolated recycled exhaust gas. Lambda is defined herein as the ratio of $(air/fuel)_{actual}$ to $(air/fuel)_{stoichiometric}$. The same reactor and gas analyzers as described in Example 1 were used for the catalytic tests. Catalysts C and F were sized to ~25-40 mesh and diluted with silica at a weight ratio of ~1:15. Catalyst loadings were ~0.09 grams for catalyst C and ~0.090 grams for catalyst F, respectively. In reaction step 1, the catalyst was exposed for about three hours to a feed gas comprising ~13.2 mol % propane, ~27.4 mol % $H_2O$, ~26.6 mol % $CO_2$, and balance $N_2$, at a gas hourly space velocity of ~26 khr⁻¹. After reaction step 1, about 17 mol % of the $N_2$ feed was replaced with $H_2$, and the catalyst was exposed for about three more hours to the feed gas. The temperature was the average catalyst bed temperature measured at the catalyst inlet and catalyst outlet, as defined in Example 1.

Table 1 shows the average propane conversion and the average methane selectivity, expressed as moles of methane formed divided by moles of fuel carbon converted per unit time, in propane steam reforming without (reaction step 1) and with $H_2$ addition (reaction step 2) for catalyst C and F. The average catalyst bed temperatures were ~395° C. in reaction step 1 and ~410° C. in reaction step 2 for catalyst C, and ~402° C. in reaction step 1 and ~410° C. in reaction step 2 for catalyst F.

TABLE 1

| Catalyst | C w/o $H_2$ | C with $H_2$ | F w/o $H_2$ | F with $H_2$ |
|---|---|---|---|---|
| Conversion | ~4% | ~28% | ~3% | ~53% |
| Selectivity | ~24% | ~81% | ~29% | ~91% |

Both catalyst C and F appeared to respond to hydrogen addition with an increase in propane conversion, methane selectivity, and catalyst bed temperature. The effect of hydrogen addition appeared to be more pronounced with catalyst F. The addition of $H_2$ could be achieved on-board a vehicle by running one or more cylinders rich. Upon rich combustion, part of the complete oxidation products $CO_2$ and $H_2O$ can be replaced with partial oxidation products $CO$ and $H_2$. The product stream from a rich cylinder combustion was simulated in a laboratory reactor by co-feeding CO and $H_2$ with the fuel/EGR mixture over the reformer catalyst. It was observed that the reformer activity appeared to be diminished as result of the presence of CO.

In the embodiment of Catalyst F, the increase in conversion was achieved without hydrogen being consumed under the conditions of reaction step 2. Though not fully understood and without being bound by theory, it was believed that the addition of hydrogen as taught herein can act as a promoter to enhance the catalyst's activity for hydrocarbon steam reforming and/or its selectivity for methane formation.

In one embodiment, this effect can be exploited by providing hydrogen gas at the reformer inlet. One embodiment of this aspect of the present invention can be to operate the engine in a manner such that one or more cylinders can be operated under rich combustion conditions at lambda <1, so as to generate hydrogen in the exhaust recycle gas. The exhaust gas from the isolated cylinder or cylinders operating under rich combustion can advantageously be fully recycled into the reformer to provide hydrogen rich exhaust gas for the reforming reaction. The exhaust gas from the other cylinder or cylinders operating under stoichiometric combustion can be either fully exhausted into the three way catalyst in a typical engine operation or partially recirculated into the reformer.

Example 6

In certain embodiments, the converter was segmented into two or several parts along the flow direction, and fuel was injected in two or several stages along the catalyst bed. For a two-stage injection, the reformer consisted of an upstream catalytic converter and a downstream catalytic converter. Part of the fuel was injected in front of the upstream catalytic converter. This was postulated to reduce the endotherm in the upstream catalytic converter and, once the reforming of the initial fuel injection was essentially complete, to allow the methanation reaction to develop without any significant interfering effect of the reforming reaction on $H_2/CO$ methanation. The remaining part of the fuel was injected between the two catalytic converters and in front of the downstream catalytic converter. The effect of the staged fuel injection was designed to reduce the temperature gradients across the reformer catalyst bed and to avoid a precipitous temperature drop in the front end of the converter. The more even temperature distribution can advantageously enhance the heat integration between the endothermic steam reforming reaction and the exothermic methanation reaction. The net effect of the better heat integration can advantageously be a higher methane selectivity and an overall increase in temperature and fuel conversion.

Example 7

In certain embodiments, a heat pipe can be inserted into the converter bed. The heat pipe can be oriented parallel to the gas flow. The purpose of the heat pipe can be to redistribute heat from hotter reaction zones to colder reaction zones in the reactor.

Example 8

Example compositions produced by a reformer of the present invention were combusted in an engine simulation. One composition that was combusted, denoted Mixture 1, contained ~62% nitrogen, ~12.4% carbon dioxide, ~0.1% water vapor, ~8.2% carbon monoxide, ~0.5% hydrogen, ~16.4% methane, ~0.16% toluene vapor, ~0.17% isooctane vapor, and ~0.05% n-heptane vapor. Mixture 1 contained a molar ratio of $CH_4/H_2$ of ~32.8. A second composition that was combusted, denoted Mixture 2, contained ~55% nitrogen, ~5.24% carbon dioxide, ~18.8% carbon monoxide, ~12.1% hydrogen, ~8.7% methane, ~0.15% toluene vapor, ~0.15% isooctane vapor, and ~0.04% n-heptane vapor. Mixture 2 contained a molar ratio of $CH_4/H_2$ of ~0.7.

Figure 9:
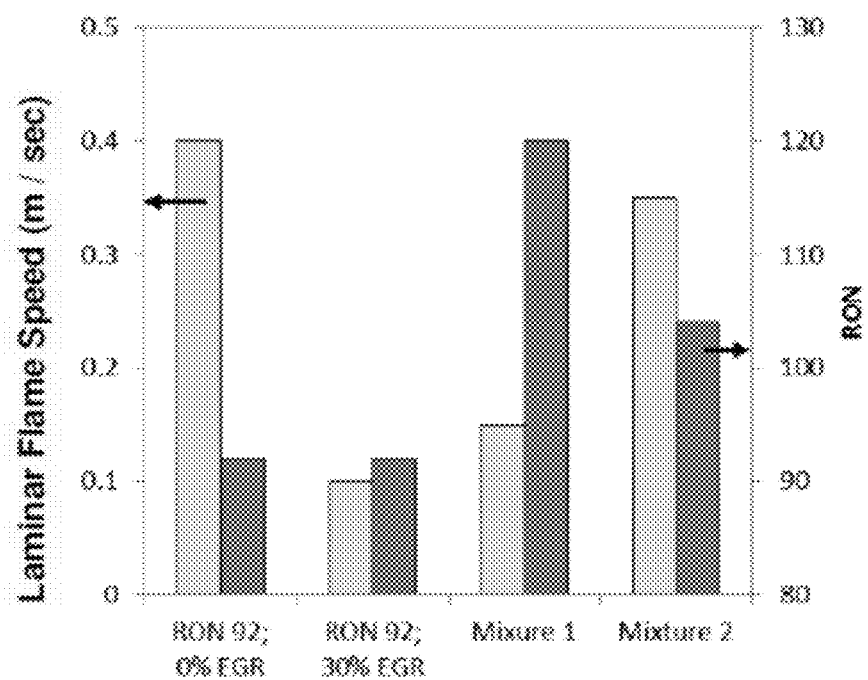
FIG. 9 shows a graph of the laminar flame speed and research octane number, or RON, of the fuel produced by an exemplary reformer.

Referring now to FIG. 9, there is shown the laminar flame speed and RON of several fuel mixtures including Mixtures 1 and 2 referred to above. Mixture 1 of the present invention appeared to have a laminar flame speed of about 0.16 m/s and a RON of about 120. Mixture 2 of the present invention appeared to have a laminar flame speed of about 0.33 m/s and a RON of about 104. The flame speed and RON of Mixtures 1 and 2 appeared to be higher than the flame speed of a conventional unreformed fuel in a powertrain with ~30% EGR. The RONs of Mixtures 1 and 2 produced by the reformer of the present invention also appeared to be higher than the RON of a conventional fuel.

Figure 10:
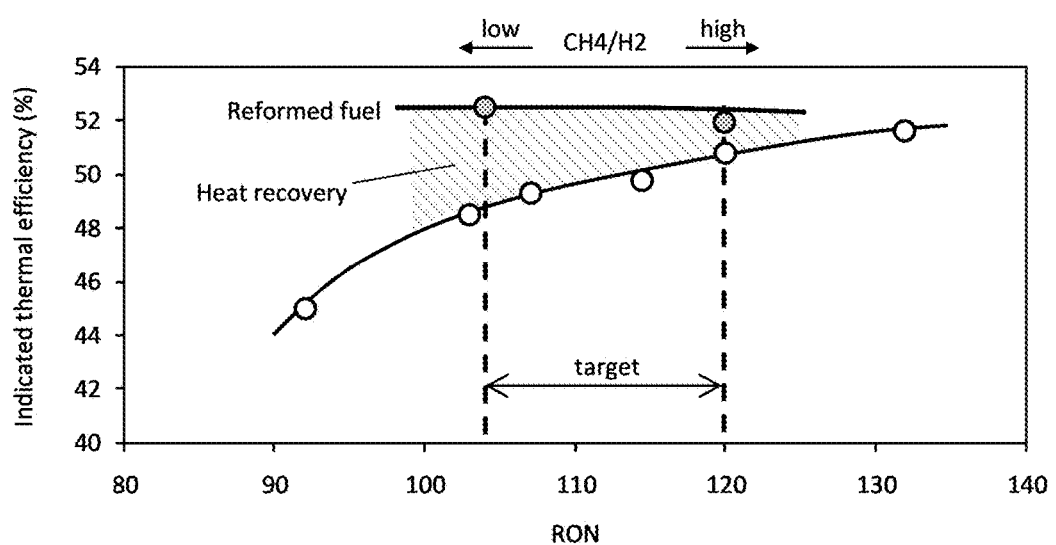
FIG. 10 shows a graph of the indicated thermal efficiency of the engine of the present invention plotted versus the research octane number (RON) of several fuels.

Mixtures 1 and 2 and several other example fuels produced by a reformer were combusted in an engine simulation. FIG. 10 was calculated with optimized effective expansion ratio (EER) of ~26 and effective compression ratio (ECR) of ~12 for maximum indicated thermal efficiency depending on the fuel RON under the assumption of fixed combustion duration. FIG. 10 shows the estimated indicated thermal efficiency increases with RON. There appeared to be a complementary effect of heat recovery and RON on indicated thermal efficiency for these composition ranges.

Example 9

Figure 11:
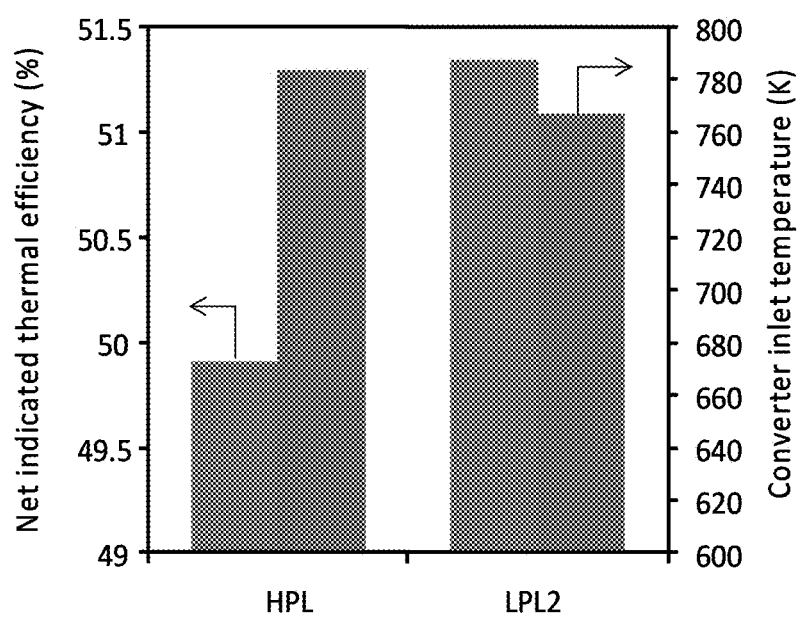
FIG. 11 shows a graph of the efficiency and converter inlet temperature of a powertrain containing two turbines and a catalytic reformer of the present invention.

A powertrain with two turbines and a reformer of the present invention illustrated in FIG. 2 was used to reform and combust a fuel in an engine simulation. Referring now to FIG. 11, there is shown the estimated efficiency and converter inlet temperature of this powertrain, as in FIG. 2, and a comparative example with only one turbine, as in FIG. 1. The efficiency of the two turbine system was about 51.3%, whereas the efficiency of the one-turbine system was lower, at about 49.8%. The gains in efficiency were believed to primarily result from reduction of pumping losses and from recovering energy in the recycled exhaust gas. The result appeared to show that the two-turbine system can achieve this gain in efficiency while maintaining the converter inlet temperature above about 760° K.

Examples 10-12

For examples 10-12, the catalysts in Table 2 were used to investigate conversion of various feeds, according to the procedures in Tests I, II, III, and IV described below. The description of the preparation of Catalyst F is provided in Example 3. The preparation methods for catalysts G-L is described below.

TABLE 2

Catalysts for Examples 10-12

| Catalyst | Support | Metals loading, wt % | Type |
|---|---|---|---|
| F (described above) | γ-Al$_2$O$_3$ | ~3.5 Rh, ~1.71 Ru | Reforming |
| G | P-ZSM-5 | 0.0 | Acid Cracking |
| H | La$_2$O$_3$—Al$_2$O$_3$—CeO$_2$—ZrO$_2$ | ~3.5 Rh | Reforming |
| I | CHA | ~0.35 Rh | Reforming + Methanation |
| J | CHA | ~1.3 Rh | Reforming + Methanation |
| K | MCM-68 | 0.0 | Acid Cracking |

| Composite catalysts | Catalysts | Catalyst wt ratio | |
|---|---|---|---|
| L | F + G | F:G = ~1:4 (physical mixture) | Cracking + Reforming |
| M | H + I | H:I = ~1:10 | Reforming + Methanation |
| N | H + J | H:J = ~1:2.7 | Reforming + Methanation |
| O | G + H + I | G:H:I = ~2:1:10 | Reforming + Methanation + Cracking |
| P | G + H + J | G:H:J = ~4:1:2.7 | Reforming + Methanation + Cracking |
| Q | K + H + J | K:H:J = ~4:1:2.7 | Reforming + Methanation + Cracking |

Preparation of Catalyst G:

A self-bound ZSM-5 sample (Si/Al ~30) was contacted with an aqueous solution of H$_3$PO$_4$ to the point of incipient wetness. The impregnated material was dried overnight at ~121° C. in stagnant air, and treated subsequently in flowing dry air (~5 volumes air/volume solids/min) for ~3 hours at ~538° C. The calcined sample contained ~1.2 wt % P.

Preparation of Catalyst H:

Catalyst H included ~3.5 wt % Rh supported on a mixed metal oxide comprising La$_2$O$_3$-γ-Al$_2$O$_3$ (~36.5 wt % of total) and CeO$_2$—ZrO$_2$ (~60 wt % of total). The La$_2$O$_3$—Al$_2$O$_3$ support was prepared separately by impregnation of an aqueous La(NO$_3$)$_3$ solution onto γ-Al$_2$O$_3$ followed by drying and calcination at ~600° C. CeO$_2$—ZrO$_2$ was co-precipitated from an aqueous Ce(NO$_3$)$_4$ and Zr(NO$_3$)$_4$ solution onto the La$_2$O$_3$—Al$_2$O$_3$ support using urea as base. The Ce:Zr atomic ratio was ~4:1. The La$_2$O$_3$-γ-Al$_2$O$_3$—CeO$_2$—ZrO$_2$ support was calcined at ~600° C. prior to incipient wetness impregnation with an aqueous solution containing Rh(NO$_3$)$_3$. After the precious metal impregnation the catalyst was calcined in air at ~600° C.

Preparation of Catalyst I:

Catalyst I included ~0.35 wt % Rh supported on zeolite CHA. A reaction mixture having the stoichiometry: 0.064 Rh: ~3 SDAOH: ~10 Na$_2$O: Al$_2$O$_3$: ~35 SiO$_2$: 1000 H$_2$O, where SDA was N,N,N-trimethyladamantylammonium, was prepared by mixing the following ingredients together in the Teflon™ liner of a ~125 ml autoclave: ~9.49 g of ~25% SDAOH, ~0.46 g of ~50% NaOH, ~43.74 g deionized water, and ~23.1 g sodium silicate (~28.2% SiO$_2$, ~9.3% Na$_2$O). A ~1.02 g solution of ~10 wt. % Rh(en)$_3$Cl$_3$.3H$_2$O (en=ethylenediamine) was slowly added while mixing with a magnetic stir bar. Then ~2.18 g of USY zeolite (~17.5% Al$_2$O$_3$, Si/Al ~2.5) was added and the mixture reacted for ~5 days at ~140° C. in a tumbling oven (~40 rpm). The product was recovered by vacuum filtration, washed with deionized water and then dried in a ~115° C. oven. Phase analysis by powder X-ray diffraction showed the sample to be pure chabazite. Analysis by X-ray fluorescence showed the sample to contain about ~0.35% Rh. The sample was finally calcined in air for ~2 hours at ~560° C. using a ramp rate of ~4.5° C./min.

Preparation of Catalyst J:

Catalyst J included ~1.31 wt. % Rh encapsulated in zeolite CHA. A synthesis mixture was prepared having the stoichiometry: ~0.2 Rh: ~2.15 SDAOH: ~7 Na$_2$O: Al$_2$O$_3$: ~25 SiO$_2$: ~715 H$_2$O, where SDAOH is N,N,N-trimethyladamantylammonium hydroxide. For preparation of the synthesis mixture, to a plastic beaker were added ~20.7 g sodium silicate (~28.2% SiO$_2$, ~9.3% Na$_2$O), ~38.0 g deionized water, ~0.5 g 50% NaOH, and ~8.8 g ~25% SDAOH. The mixture was stirred with a magnetic stirrer, and then ~4.14 g of ~10 wt % Rh(en)$_3$Cl$_3$.3H$_2$O solution (en=ethylenediamine) solution was added drop wise with stirring and then stirred until homogenous. The mixture was divided between three ~23 ml Teflon™ autoclaves and then ~0.94 g of USY zeolite (~60 wt % SiO$_2$, ~17 wt % Al$_2$O$_3$) zeolite was mixed in each liner. The autoclaves were heated for ~7 days at ~140° C. in a tumbling oven at ~25 rpm. The product was recovered by vacuum filtration and washed with de-ionized water. Phase analysis by powder X-ray diffraction showed that the sample was pure chabazite. The sample was finally calcined in air for ~3 hours at ~560° C. using a ramp of ~4.5° C./min. Analysis by X-ray fluorescence showed the sample to contain ~1.31 wt % Rh.

Preparation of Catalyst K:

MCM-68 was synthesized according to the methods described in U.S. Patent Application Publication No. 2014/0140921, the portions of which related to synthesis of MCM-68 being incorporated herein by reference. The acid form of the zeolite was prepared by pre-calcining the MCM-68 crystal at ~400° C. under nitrogen flow for 30 minutes, switching the purge gas from nitrogen to air while increasing the temperature to ~600° C., and holding at ~600° C. under flowing air for 2 hours. The pre-calcined material was then exchanged three times with NH$_4$NO$_3$ at ~98° C. Between each exchange and at the completion of the three exchanges, the MCM-68 crystal was exhaustively washed with water and then dried at ~120° C. After exchanging the crystal for the first time, the ammonium form was calcined at ~500° C. in air for ~2 hours, subsequently steamed for ~6 hours at ~538° C. The steamed MCM-68 crystal was subsequently exchanged three more time as described previously with the pre-calcined powder. Finally, the ammonium exchanged material was calcined at ~500° C. in air for ~2 hours to create the acid form of the zeolite. The Si/Al ratio was about ~10.

Preparation of Catalyst L:

Catalyst L was a physical mixture of ~4 parts of Catalyst G to ~1 part of Catalyst F.

Preparation of Catalyst M:

Catalyst M was a physical mixture of ~75 mg of catalyst H and ~750 mg of catalyst I such that equal amounts of Rh were supported on the support of catalyst H (consisting of alumina, lanthana, ceria, and zirconia) and on the support of catalyst I (consisting of chabazite).

Preparation of Catalyst N:

Catalyst N was a physical mixture of ~50 mg of catalyst H and ~133 mg of catalyst J such that equal amounts of Rh were supported on the support of catalyst H (consisting of alumina, lanthana, ceria, and zirconia) and on the support of catalyst J (consisting of chabazite).

Preparation of Catalyst O:

Catalyst O was a physical mixture of ~50 mg of catalyst H, ~500 mg of catalyst I and ~100 mg of catalyst G such that equal amounts of Rh were supported on the support of catalyst H (consisting of alumina, lanthana, ceria, and zirconia) and on the support of catalyst I (consisting of chabazite).

Preparation of Catalyst P:

Catalyst P was a physical mixture of ~50 mg of catalyst H, ~133 mg of catalyst J, and ~200 mg of catalyst G such that equal amounts of Rh were supported on the support of catalyst H (consisting of alumina, lanthana, ceria, and zirconia) and on the support of catalyst J (consisting of chabazite).

Preparation of Catalyst Q:

Catalyst P was a physical mixture of ~50 mg of catalyst H, ~133 mg of catalyst J, and ~200 mg of catalyst K such that equal amounts of Rh were supported on the support of catalyst H (consisting of alumina, lanthana, ceria, and zirconia) and on the support of catalyst J (consisting of chabazite).

Test I: n-Heptane Cracking

For the catalytic test I, ~0.353 g of catalyst powder G sized to ~25~40 mesh was diluted with silica at a ratio ~4:11. The diluted catalyst was loaded into a vertically mounted cylindrical quartz plugged flow reactor (6 mm id×15 mm long) which was heated by a furnace. A feed gas comprising ~5.7 mol % n-heptane, ~27.4 mol % $H_2O$, ~26.6 mol % $CO_2$ in $N_2$ (balance of gas mixture) was fed over the catalyst at a pressure of ~1.3 bar and at a residence time of about ~171 g zeolite*sec/g fuel. The conversion of n-heptane and the concentration of the cracked reaction products were monitored by GC/FID analyzers. The catalyst was run four three hours at four temperatures corresponding to ~475° C., 500° C., 525° C., and 550° C. furnace set temperature for four hours at each temperature. The catalyst bed temperature was measured in the front catalyst bed (¼ inch from catalyst inlet) and in the rear catalyst bed (¼ inch from the catalyst outlet). The average catalyst bed temperature was calculated from the catalyst bed temperatures at the inlet and outlet. After each temperature the catalysts were subjected to a stream containing ~5 mol % $O_2$ in balance $N_2$ at ~550° C. furnace set temperature for ~20 min in order to remove any carbonaceous deposits.

Test II: n-Heptane and Toluene Cracking

For the catalytic test II, ~0.353 g of catalyst powder G sized to ~25-40 mesh was diluted with silica at a ratio ~4:11. The diluted catalyst was loaded into a vertically mounted cylindrical quartz plugged flow reactor (~6 mm id×~15 mm long) which was heated by a furnace. A feed gas comprising ~2.5 mol % n-heptane, ~3.1 mol % toluene, ~27.4 mol % $H_2O$, and ~26.6 mol % $CO_2$ in $N_2$ (balance of gas mixture) was fed over the catalyst at a pressure of ~1.3 barg (~130 kPag) and at a residence time of ~171 g zeolite*s/g fuel. The fuel conversion and the concentration of the cracked reaction products were monitored by GC/FID analyzers. The catalyst was run for three hours at four temperatures corresponding to ~475° C., 500° C., 525° C., and 550° C. furnace set temperature for four hours at each temperature. The catalyst bed temperature was measured in the front catalyst bed (¼ inch from catalyst inlet) and in the rear catalyst bed (¼ inch from the catalyst outlet). The average catalyst bed temperature was calculated from the catalyst bed temperatures at the inlet and outlet. After each temperature the catalysts were subjected to a stream containing ~5 mol % $O_2$ in balance $N_2$ at ~550° C. furnace set temperature for ~20 minutes in order to remove any carbonaceous deposits.

Test III: Reforming and Cracking of n-Heptane

Catalysts F and L were tested in a laboratory reactor in the steam reforming and cracking reaction of n-heptane. For the test catalysts were sized to ~40-60 mesh and blended with quartz sized to ~60-80 mesh to obtain ~4 cm³ of catalyst-quartz. For the reforming test, ~75 mg of catalyst F were used. For the reforming and cracking test of catalyst L, ~75 mg of catalyst F were physically mixed with ~300 mg of catalyst G. The catalyst diluent mixture was loaded into a stainless steel reactor tube of ~4" length and ~0.3" inner diameter. The reactor tube was heated by a furnace to maintain a constant temperature of ~500° C. throughout the length of the catalyst bed. A thermocouple in the bed was used to confirm that experiments were performed isothermally. A gas mixture comprising ~2.5 mol % n-heptane, ~13 mol % $H_2O$, and ~11 mol % $CO_2$ in $N_2$ balance was fed to the catalyst at a pressure of ~2 barg (~200 kPag). The total gas flow rate was varied between ~70 ml/min and ~400 ml/min to achieve different levels of fuel conversion. Reaction products CO, $CO_2$, and $H_2$, were analyzed by GC-TCD, while $CH_4$ and higher hydrocarbon products were analyzed by GC-FID. Tests were conducted at a residence time of ~10 g Rh*s/g fuel for catalysts F and L. For the test of catalyst L the residence time was ~300 g zeolite*s/g fuel.

Test IV: Reforming and Cracking of Multi Component Fuel

Catalysts H, M, N, O, P, and Q were tested on a surrogate gasoline type fuel containing ~45 vol % 3-methyl pentane, ~15 vol % n-hexane, ~10 vol % 2,2,4-trimethyl pentane (iso-octane), ~20 vol % toluene, and ~10 vol % ethanol. The same reactor and procedures as described in test III were used for the multi component model fuel reforming test. A gas mixture comprising ~1.4 mol % 3-methyl pentane, ~0.46 mol % n-hexane, ~0.25 mol % 2,2,4 trimethyl pentane, ~0.76 mol % toluene, ~0.69 mol % ethanol, ~13.1 mol % $H_2O$, and ~12.6 mol % $CO_2$ in $N_2$ balance was fed at ~2 barg (~200 kPag) and ~500° C. catalyst bed temperature. Reaction products CO, $CO_2$, and $H_2$, were analyzed by GC-TCD, while $CH_4$ and higher hydrocarbon products were analyzed by GC-FID. Tests were conducted at a residence time of ~10 g Rh*s/g fuel for catalysts H, M, N, O, P, and Q, at ~287 g zeolite*s/g fuel for catalyst O, and at ~570 g zeolite*s/g fuel for catalysts P and Q. It was observed that the conversion of ethanol was ~100% for all catalysts under conditions of test IV. The ethanol conversion is therefore not reported in the examples.

Example 10—Results from Test I

Figure 12:
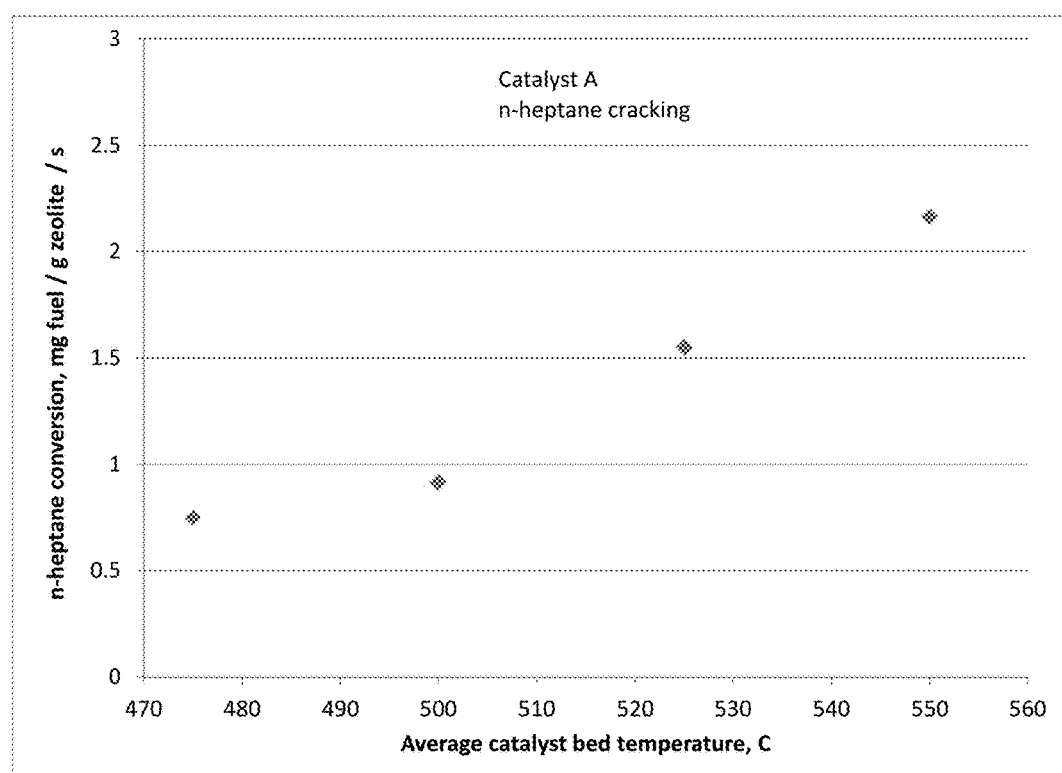
FIG. 12 shows a graph of conversion rates for conversion of n-heptane in the presence of an exemplary catalyst composition.

FIG. 12 shows the results from the procedures described in Test I. FIG. 12 shows the conversion rate (in mg n-heptane per g of catalyst per time) for n-heptane at various temperatures in the presence of catalyst G. As shown in FIG. 12, the P-ZSM-5 in catalyst G appeared to be effective for conversion of n-heptane by cracking, with increasing conversion rate as temperature increased. The conversion values shown appeared to be stable at each temperature. It was noted that the cracked products generated from cracking of n-heptane predominantly corresponded to high octane molecules.

Example 11—Results from Test II

Figure 14:
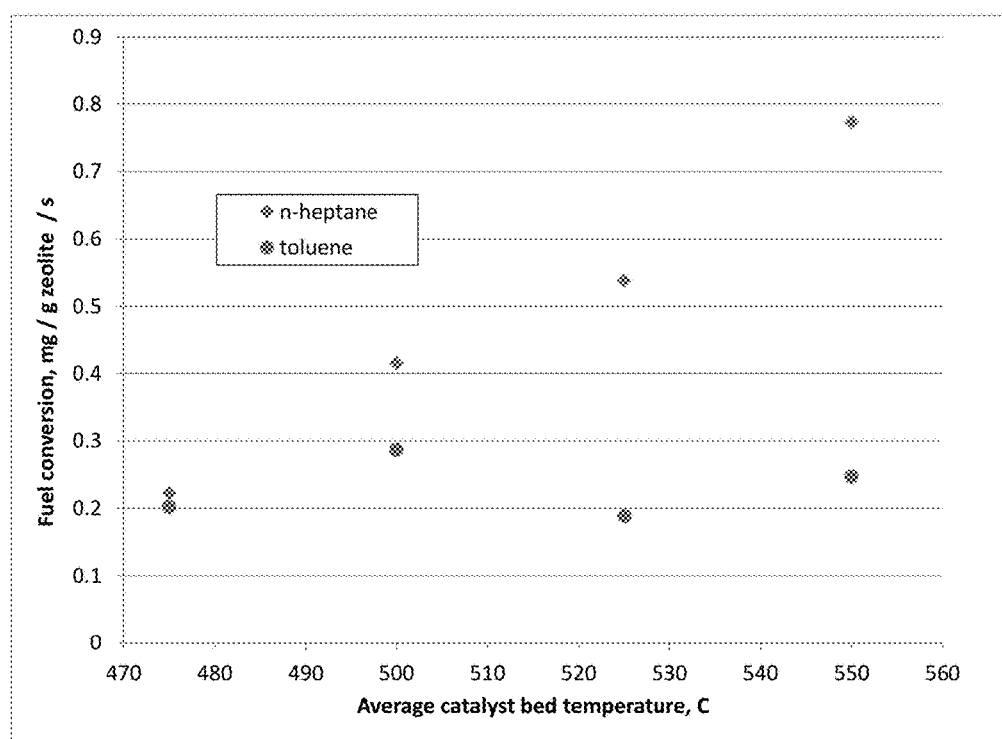
FIG. 14 shows a graph of conversion rates for n-heptane and toluene in the presence of an exemplary catalyst composition.

FIG. 14 shows the results from the procedures described in Test II. In FIG. 14, the conversion rates for n-heptane and toluene were shown for exposure of a mixture of n-heptane and toluene to catalyst G at various temperatures. FIG. 14 shows that the presence of toluene, a representative aromatic component for a naphtha boiling range fuel, did not appear to suppress the cracking activity of the P-ZSM-5 catalyst for cracking of n-heptane. It was noted that the partial pressure of n-heptane in the reaction environment was lower, perhaps due to the use of a mixture of n-heptane and toluene as a fuel, which was believed to account for the lower absolute values with regard to the rate of n-heptane conversion.

Example 12—Results from Tests III and IV

Figure 15B:
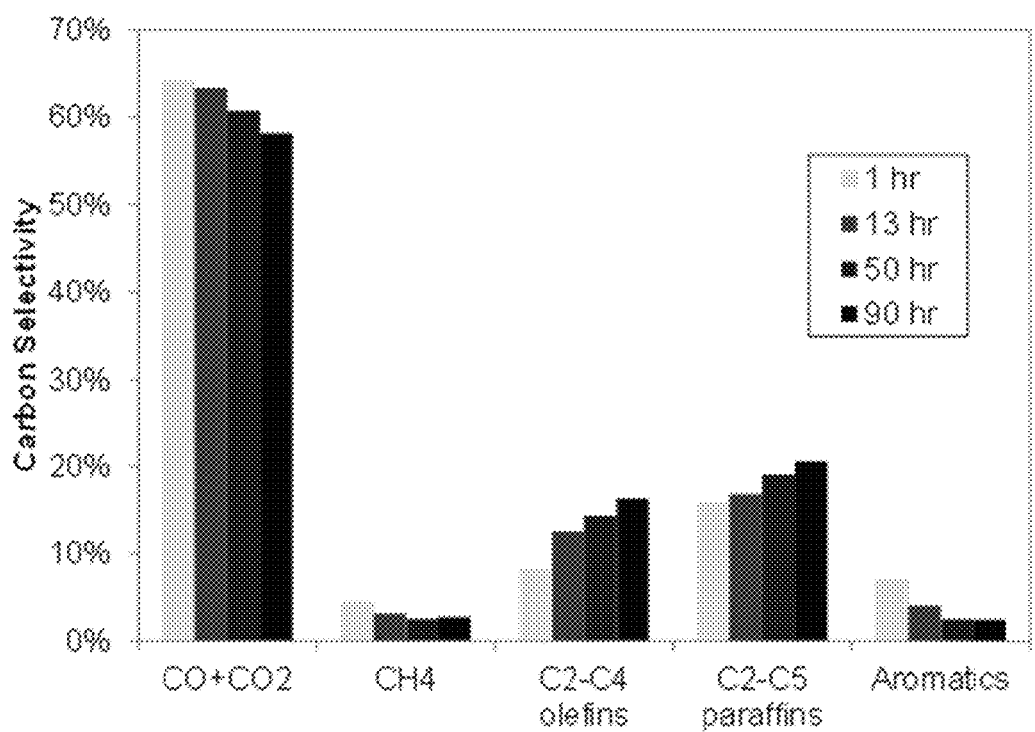

FIGS. 15A and 15B show results from the procedures described in Test III for exposure of an n-heptane feed to catalysts F and L. In FIG. 15A, n-heptane conversion is shown as a function of residence time at ~500° C. and ~2 barg (~200 kPag). The data points corresponding to circles and squares in FIG. 15A correspond to catalyst F, while the diamonds correspond to catalyst L. FIG. 15A shows that catalyst J, which corresponds to including some ZSM-5 in catalyst F, provided a higher percentage of n-heptane conversion at a given residence time than a similar reforming catalyst without the additional cracking functionality. FIG. 15B shows that the activity of catalyst F appeared to be stable over time. In FIG. 15B, for each type of product, the selectivity was shown as a series of vertical bars, with the left hand bar corresponding to the product selectivity after ~1 hour of exposure to the feed, and the next bars corresponding to the selectivity at ~13 hours of exposure, ~50 hours of exposure, and finally ~90 hours of exposure for the right hand bar. It was noted that the selectivity appeared to improve over time for forming $C_2$-$C_4$ olefins and $C_2$-$C_5$ paraffins, while reducing the amount of carbon oxides.

Figure 16A:
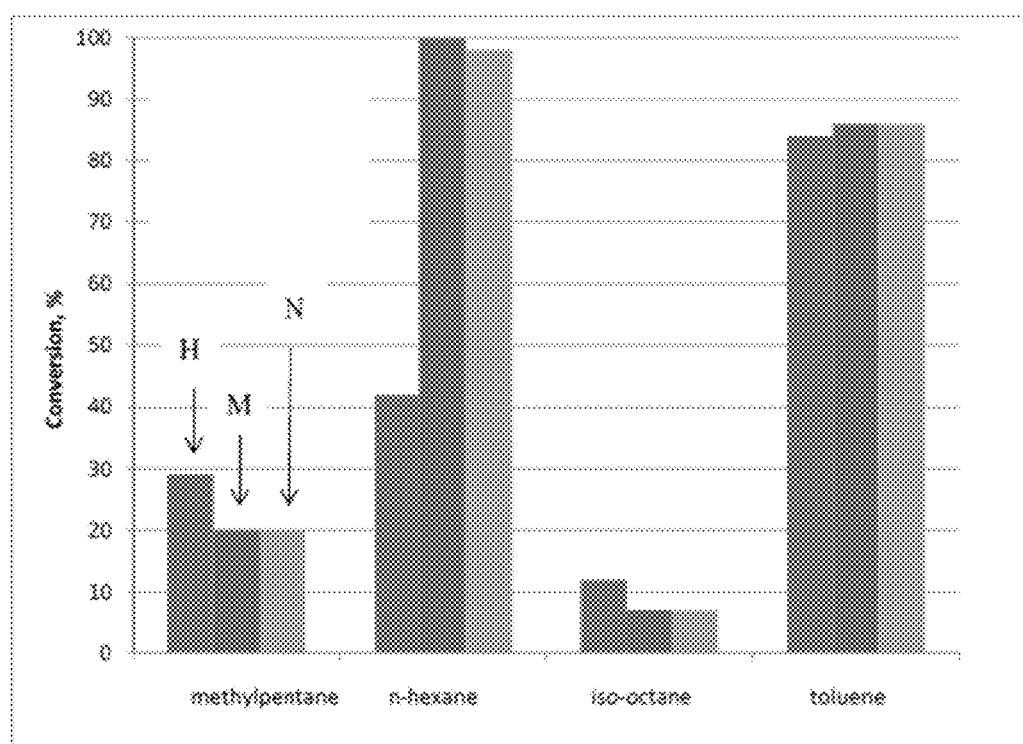
FIGS. 16A, 16B, 16C, and 16D show graphs of conversion rates and product distributions for conversion of a model fuel composition in the presence of an exemplary catalyst composition.

FIG. 16A shows the results for conversion of individual components of the model gasoline feed over catalysts H, M, and N under the conditions for Test IV. For each component of the model gasoline feed, the conversion percentages are shown with catalyst H as the left bar, catalyst M as the middle bar, and catalyst N as the right bar. As shown in FIG. 16A, the catalysts had somewhat similar activity for cracking of toluene, methyl-pentane, and iso-octane. However, for the relatively low octane component n-hexane, catalysts M and N showed a substantial improvement in conversion. This can be beneficial, as n-hexane is a relatively low octane component, while methylpentane and iso-octane have reasonably high octane values without conversion. Thus, catalysts M and N appeared to correspond to catalysts selective for cracking of the lower octane (unbranched alkane) components of a potential gasoline.

Table 3 provides further details regarding the output composition from the conversion reaction for catalysts H and M.

TABLE 3

Reactor Output Compositions

| Component | Catalyst H reactor out mol % | Catalyst M reactor out mol % |
|---|---|---|
| Methylpentane | ~0.94 | ~1.02 |
| Benzene | ~0.52 | ~0.51 |
| Iso-octane | ~0.20 | ~0.22 |
| Toluene | ~0.12 | ~0.11 |
| CO | ~3.87 | ~2.11 |
| $CO_2$ | ~13.03 | ~13.73 |
| $H_2$ | ~12.02 | ~7.23 |
| $CH_4$ | ~0.41 | ~3.42 |
| $H_2O$ | ~4.93 | ~6.24 |
| $N_2$ | ~63.97 | ~65.43 |

As shown in Table 3, inclusion of the methanation component (Rh-CHA) in catalyst M resulted in a substantial increase in the mole percentage of methane present in the output from the reforming (conversion) reactor. The amount of methane produced by catalyst H was ~0.4 mol %, while catalyst M produced ~3.4 mol %. This demonstrated that inclusion of a methanation component can substantially enhance the amount of methanation performed in a reforming reaction environment.

Figure 16B:
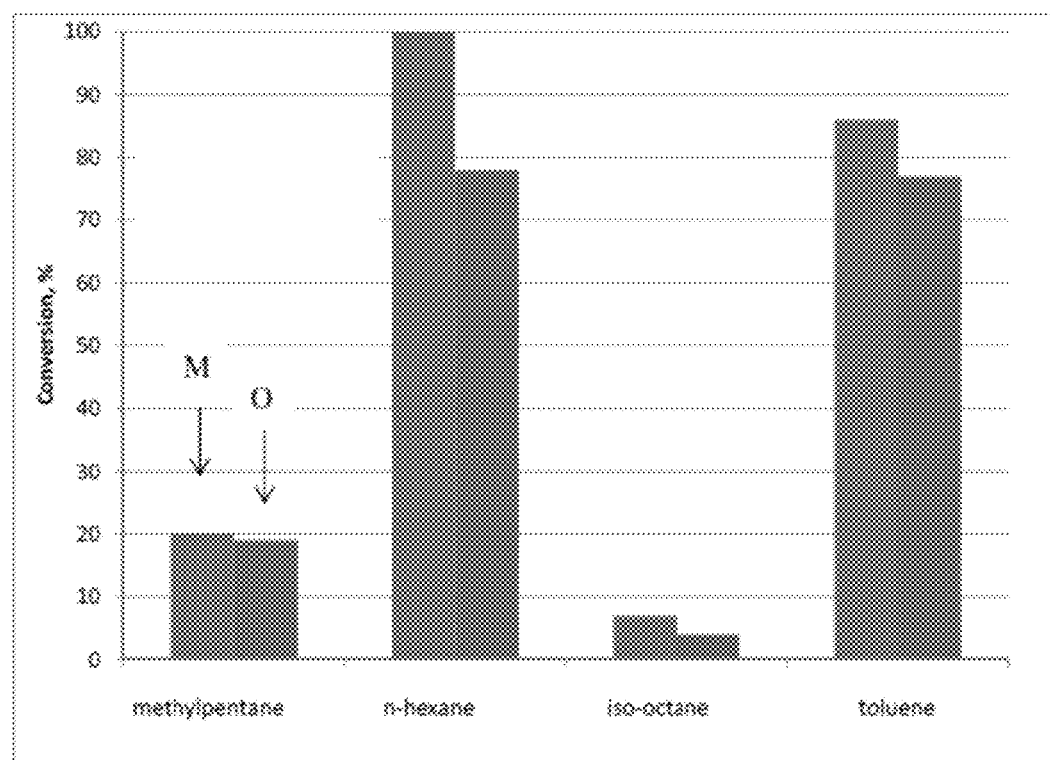

FIG. 16B shows the results for conversion of individual components of the model gasoline feed over catalysts M and O under the conditions for Test IV. For each component of the model gasoline feed, the conversion percentages are shown with catalyst M as the left bar and catalyst O as the right bar. As shown in FIG. 16B, the catalysts were similar in activity for conversion of the model gasoline components, with catalyst M generally being higher for conversion of each component, including substantially complete conversion of n-hexane. This showed that the addition of P-ZSM-5 as a cracking component had only a modest impact on the catalyst activity, and, to the degree an impact was observed, the impact was to reduce overall conversion.

Figure 16C:
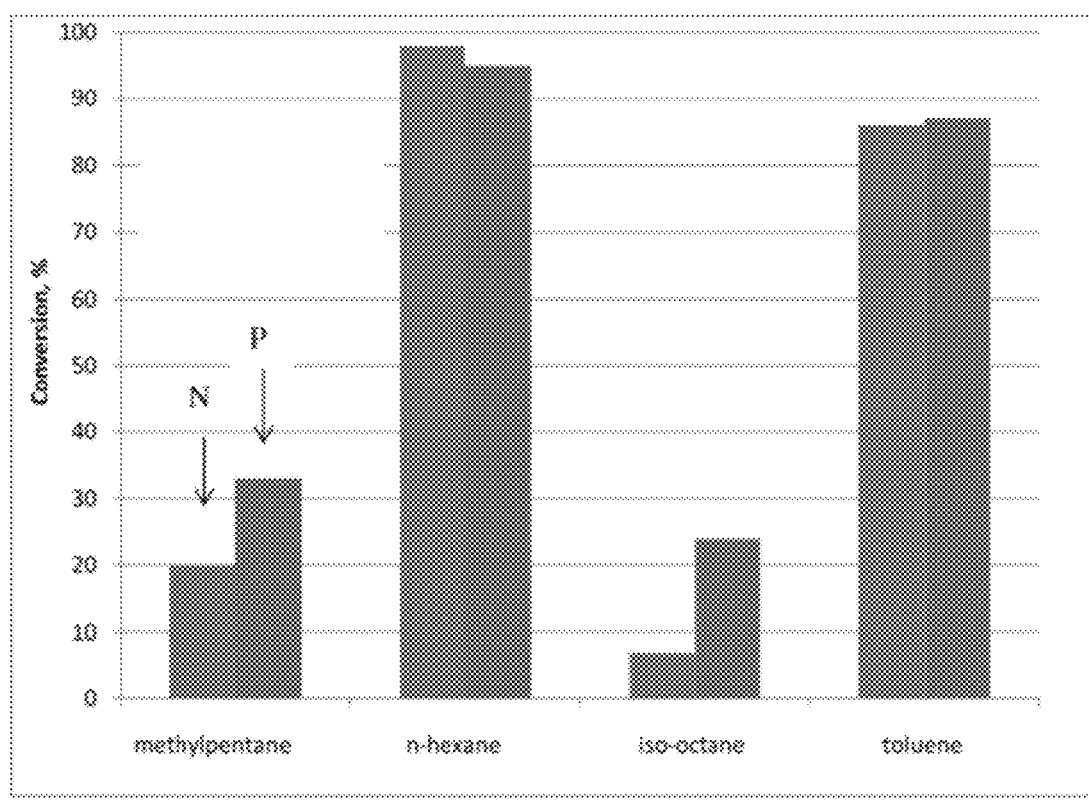

FIG. 16C shows the results for conversion of individual components of the model gasoline feed over catalysts N and P under the conditions for Test IV. The comparison in FIG. 16C was similar to the comparison in FIG. 16B, with the exception that the methanation component of the catalyst composition (Rh supported on CHA) was formed by an alternative procedure. For each component of the model gasoline feed, the conversion percentages are shown with catalyst N as the left bar and catalyst P as the right bar. As shown in FIG. 16C, the catalysts were similar in activity for conversion of the model gasoline components. However, FIG. 16C showed that forming the methanation component by the alternative method provided increased conversion for the methylpentane and iso-octane feed components after inclusion of the cracking component. Additionally, the reduction in n-hexane conversion was smaller after addition of the cracking component.

In order to further investigate the difference in activity between the different methods for forming the Rh-CHA methanation components corresponding to catalysts I and J (as incorporated into catalysts O and P, respectively), CO chemisorption studies were performed. Without being bound by any particular theory, CO chemisorption is believed to provide an indication of relative particle size of metal particles formed on a supported catalyst based on the ratio of CO chemisorbed relative to amount of metal.

For the CO chemisorption experiments, a catalyst sample of an amount typically between ~40 mg and ~250 mg was mixed with quartz of an amount of typically about 220 mg and loaded into a flow reactor. The sample was outgassed in a flow of about 30 ml/min of He for ~2 hours at ~450° C. (ramp rate ~10° C./min), then cooled to ~50° C. in He flow. At ~50° C., the catalyst sample was exposed to a flow of pure $H_2$ and subsequently heated for ~2 hours at ~400° C. in flowing $H_2$ at a flow rate of about ~30 ml/min. At ~400° C., the sample was exposed for ~100 mins to flowing He at ~30 ml/min in order to desorb chemisorbed hydrogen from the catalyst. The sample was subsequently cooled to ~50° C. in He flow of ~30 ml/min and then exposed to pulses of ~10% CO in He at ~50° C. The gas flow rate of the CO/He mixture during the pulse was about 7.5 ml/min. Between pulses the sample was purged with He at ~50° C. at a flow rate of about 22.5 ml/min. The CO pulses were quantified with a TCD analyzer. The amount of CO taken up by the sample was determined from the difference of the integrated CO signals observed at the reactor outlet relative to the CO signals measured in a bypass mode.

Catalysts I and J were exposed to the CO chemisorption method described above. In the chemisorption experiments, the ratio of CO chemisorbed to Rh (metal) in the catalyst for catalyst I was about 0.9, while the ratio for catalyst J was about 0.5. The lower ratio of CO to Rh for catalyst J may indicate that the size of the metal particles formed in catalyst J was larger. This difference in the CO chemisorption behavior for catalyst J (incorporated into catalysts P and Q) may be related to the improved activity when a cracking component was present, as compared to the limited (negative) impact on activity observed when catalyst I was combined with a cracking component in catalyst O.

Figure 16D:
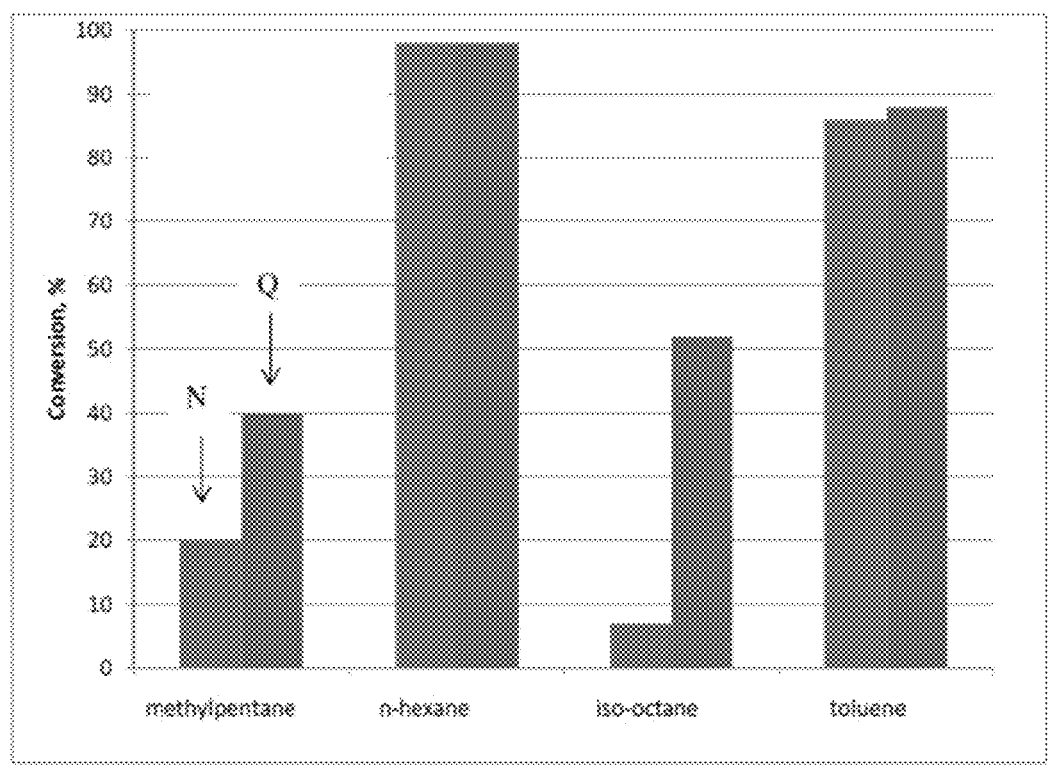

FIG. 16D shows the results for conversion of individual components of the model gasoline feed over catalysts N and Q under the conditions for Test IV. The comparison in FIG. 16D was similar to the comparison in FIG. 16C, with the exception that the MCM-68 was used as the cracking component. For each component of the model gasoline feed, the conversion percentages are shown with catalyst N as the left bar and catalyst Q as the right bar. As shown in FIG. 16D, the catalysts appeared similar in activity for conversion of the model gasoline components. In a comparison between FIGS. 16C and 16D, it appeared that use of MCM-68 as the cracking component in place of P-ZSM-5 resulted in further improved activity for cracking of the methylpentane and iso-octane components.

Example 13—Thermal Cracking in an Engine Cylinder

A series of simulations were used to assess the use of thermal cracking in an engine cylinder. In the simulations, a model fuel was simulated corresponding to ~13 vol % n-heptane, ~38 vol % toluene, and ~49 vol % iso-octane.

Figure 17:
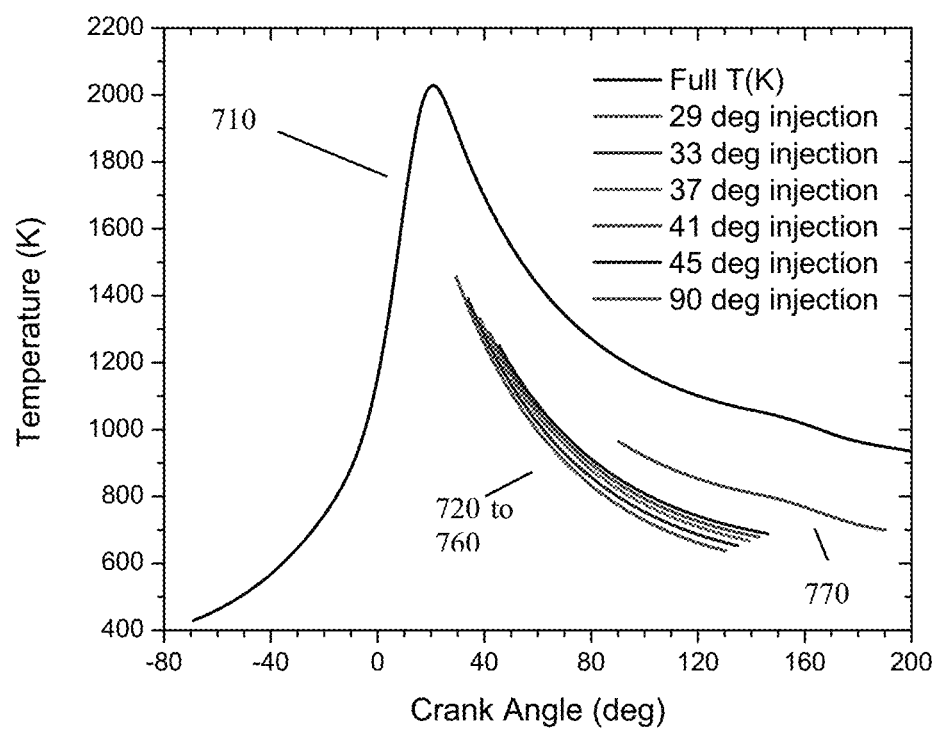
FIG. 17 shows a graph of temperature relative to crank angle for a cylinder during a combustion cycle.

In a first simulation, the pressure and temperature profile for a dedicated cylinder in an engine having a configuration similar to FIG. 13 was prepared using GT-Power software. The simulations were used to generate pressure and temperature curves for the cylinder prior to and after combustion in the cylinder of the model fuel described above. FIG. 17 shows the temperature curves that were generated by the simulations. In FIG. 17, the temperature curve for combustion of the model fuel without any additional injection of fuel for thermal cracking corresponded to curve 710. The temperature curve for a crank angle of ~90° corresponded to curve 770. For the other crank angles of ~29° to ~45°, the temperature curves in FIG. 17 formed a grouping, with the curve for a crank angle of ~29° (curve 720) being the left most curve of the group, while the curve for a crank angle of ~45° (curve 760) was the right most curve of the group. The temperature in the cylinder is shown in Kelvin relative to the crank angle for the piston in the cylinder.

A series of modified simulations were also performed where, after combustion, additional fuel was injected into the cylinder. As shown in FIG. 17, the injection of additional fuel was simulated at several crank angles, including ~29° (curve 720), ~33° (curve 730), ~37° (curve 740), ~41° (curve 750), ~45° (curve 760), and ~90° (curve 770). A crank angle of ~29° was believed to be a sufficient delay so that combustion would be complete prior to injection of the additional fuel. However, a later crank angle might be desirable from an engineering standpoint, so the impact of using several later crank angle values was also investigated. Also, depending on engine design parameters, such as the level of turbulent mixing, a fuel can typically vaporize and heat up across a range of crank angles. As shown in FIG. 17, injection of additional fuel appeared to reduce the temperature in the cylinder due to expansion of the additional fuel as well as heating and cracking of the fuel. However, the temperature of the cylinder appeared to remain in a suitable range for continuing operation of the engine.

Predictions of the conversion levels and product compositions were then prepared using the pressure curve from calculated, as described above, with each of the modified temperature curves shown in FIG. 17 using a 1D flow model representing the composition in the cylinder vs. time during the expansion stroke. These predictions were made with three alternative molecular level chemistry mechanisms. All three models showed substantial conversions and high yields of hydrogen and light olefins achievable with optimization of injection timing. Table 4 shows the average conversion results for the three different models at the various crank angle that were simulated.

TABLE 4

| Predicted cracking of model fuel (vol %) at various crank angles | | | | | |
|---|---|---|---|---|---|
| Conversion | 29 degrees | 33 degrees | 37 degrees | 41 degrees | 45 degrees |
| n-$C_7H_{16}$ | ~96% | ~83.5 | ~66.9 | ~53.4 | ~40.3 |
| i-$C_8H_{18}$ | ~100% | ~98.8 | ~89.8 | ~74.8 | ~56.5 |
| $C_6H_5CH_3$ | ~34.6% | ~29.0 | ~23.5 | ~18.5 | ~13.7 |

In Table 4, it was noted that all of the models showed a high level of cracking for both n-heptane and iso-octane, indicating that cracking can be effective for conversion of both linear and branched aliphatic compounds in a fuel.

The model simulations also generated compositional data for the cracking products. For example, the average product composition for the major products generated by the models for cracking of the model feed at a crank angle of ~29 degrees was: ~20.0 vol % methane; ~3.3 vol % ethane; ~15.0 vol % ethylene; ~16.8 vol % propylene; ~15.4 vol % iso-butene; ~16.0 vol % toluene; and ~11.4 vol % $H_2$. As shown in Table 4, at a ~29 degree crank angle, the cracking of the aliphatic compounds was substantially complete, but the converted products include a portion of unconverted toluene. The volume percentages did not sum to exactly 100% due to the presence of about 2-3 vol % of other minor cracking products.

All patents, test procedures, and other documents cited herein, including priority documents, are fully incorporated by reference to the extent such disclosure is not inconsistent with this invention and for all jurisdictions in which such incorporation is permitted. Should the disclosure of any of the patents and/or publications that are incorporated herein by reference conflict with the present specification to the extent that it might render a term unclear, the present specification shall take precedence.

As is apparent from the foregoing general description and the specific embodiments, while forms of the invention have been illustrated and described, various modifications can be made without departing from the spirit and scope of the invention. Accordingly, it is not intended that the invention be limited thereby. Many variations will suggest themselves to those skilled in this art in light of the above detailed description. All such variations are within the full intended scope of the appended claims. Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

What is claimed is:

1. A method of operating an internal combustion engine using methane-assisted combustion, comprising:
    (a) providing an exhaust gas-containing mixture to an exhaust gas recycle reformer; the exhaust gas-containing mixture comprising recycled exhaust gas and a first hydrocarbon-containing fuel;
    (b) converting at least a portion of the exhaust gas-containing mixture in the presence of heat and a catalyst composition to a reformed gaseous mixture comprising $CH_4$, $CO$, $CO_2$, $H_2O$, $N_2$, and $H_2$, said $CH_4$ being present at a concentration greater than about 1.0 mol % $CH_4$, based on the total moles of gas in the reformed gaseous mixture, said catalyst composition comprises a hydrocarbon-reforming catalyst, the catalyst composition having a hydrocarbon-reforming catalyst loading from 1.0 wt % to 10.0 wt %, based on the total weight of the catalyst composition, the metal of the hydrocarbon-reforming catalyst being rhodium or a combination of rhodium and platinum or a combination of rhodium and ruthenium;
    (c) introducing at least a portion of the reformed gaseous mixture and a second hydrocarbon-containing fuel into the engine, wherein said second hydrocarbon-containing fuel may be the same or different from the first hydrocarbon-containing fuel;
    (d) combusting the at least a portion of the reformed gaseous mixture and second hydrocarbon-containing fuel in the engine to form an exhaust gas, the exhaust gas comprising a first portion of the exhaust gas and a second portion of the exhaust gas; and
    (e) passing a first portion of the exhaust gas through a first heat exchanger to extract heat from the first portion of the exhaust gas, the recycled exhaust gas comprising the second portion of the exhaust gas.

2. The method of claim 1, wherein the first hydrocarbon-containing fuel comprises about 2.0 mol % or less of $CH_4$.

3. The method of claim 1, further including prior to introducing the reformed gaseous mixture into the internal combustion engine, cooling the gaseous mixture by passing the gaseous mixture through the first heat exchanger or a second heat exchanger.

4. The method of claim 1, wherein providing the exhaust gas-containing mixture to the reformer does not substantially include providing an oxygen-containing gas other than engine exhaust gas and a first hydrocarbon-containing fuel.

5. The method of claim 1, wherein the catalyst composition further comprises a metal oxide composition, the metal oxide composition being selected from aluminum oxides, silicon oxides, rare-earth metal oxides, Group IV metal oxides, and mixtures thereof.

6. The method of claim 5, wherein the metal oxide composition comprises a mixture of an aluminum-containing oxide and a cerium-containing oxide.

7. The method of claim 1, wherein the catalyst composition further comprises at least one medium pore molecular sieve or large pore molecular sieve.

8. The method of claim 1, wherein the catalyst composition further comprises ZSM-5, phosphorus-modified ZSM-5, MCM-68, or a combination thereof.

9. The method of claim 1, wherein providing an exhaust gas-containing mixture to an exhaust gas recycle reformer comprises:
    passing at least a portion of the first hydrocarbon-containing fuel into a cylinder of the engine after the combusting of the reformed gaseous mixture and second hydrocarbon-containing fuel to form a portion of the exhaust gas;
    cracking the at least a portion of the first hydrocarbon-containing fuel in the cylinder to form a cracked hydrocarbon-containing fuel; and
    providing the portion of the exhaust gas and the cracked hydrocarbon-containing fuel to the exhaust gas recycle reformer.

10. The method of claim 1, further comprising pre-combusting a portion of exhaust gas-containing mixture prior to providing the exhaust gas-containing mixture to the exhaust gas recycle reformer, the exhaust gas recycle reformer having a reformer inlet temperature of about 525° C. to about 625° C.

11. A method of increasing the octane rating of an internal combustion engine exhaust gas stream, said method comprising:
    (a) providing an exhaust gas-containing mixture to an exhaust gas recycle reformer; the exhaust gas-containing mixture comprising recycled exhaust gas and a first hydrocarbon-containing fuel, said exhaust gas-containing mixture containing about 3.0 mol % of $CH_4$ or less and having an initial octane rating of less than 93 RON; and
    (b) in the presence of a catalyst composition comprising a hydrocarbon-reforming catalyst, the catalyst composition having a hydrocarbon-reforming catalyst loading from 1.0 wt % to 10.0 wt %, based on the total weight of the catalyst composition, the metal of the hydrocarbon-reforming catalyst being rhodium or a combination of rhodium and platinum or a combination of rhodium and ruthenium, converting under reforming conditions at least a portion of the exhaust gas-containing mixture to a reformed gaseous mixture having a second octane rating (RON) from 100 to 125, the reformed gaseous mixture comprising $H_2$, $CO$, $CO_2$, $H_2O$, $N_2$, and greater than about 1.0 mol % $CH_4$ based on the total moles of gas in the reformed gaseous mixture.

12. The method of claim 11, wherein said converting supplies heat sufficient to maintain the reformer at an average reformer temperature above about 450° C.

13. The method of claim 11, wherein the catalyst composition further comprises a metal oxide composition, the metal oxide composition being selected from aluminum oxides, silicon oxides, rare-earth metal oxides, Group IV metal oxides, mixtures of an aluminum-containing oxide and a cerium-containing oxide, and mixtures thereof.

14. The method of claim 11, wherein the catalyst composition further comprises at least one medium pore molecular sieve or large pore molecular sieve, the at least one medium pore molecular sieve or large pore molecular sieve preferably being ZSM-5, phosphorus-modified ZSM-5, MCM-68, or a combination thereof.

15. The method of claim 11, wherein providing an exhaust gas-containing mixture to an exhaust gas recycle reformer comprises:
 passing at least a portion of the first hydrocarbon-containing fuel into a cylinder of the engine after the combusting of the reformed gaseous mixture and second hydrocarbon-containing fuel to form a portion of the exhaust gas;
 cracking the at least a portion of the first hydrocarbon-containing fuel in the cylinder to form a cracked hydrocarbon-containing fuel; and
 providing the portion of the exhaust gas and the cracked hydrocarbon-containing fuel to the exhaust gas recycle reformer.

16. The method of claim 11, further comprising pre-combusting a portion of exhaust gas-containing mixture prior to providing the exhaust gas-containing mixture to the exhaust gas recycle reformer, the exhaust gas recycle reformer having a reformer inlet temperature of about 525° C. to about 625° C.

\* \* \* \* \*